United States Patent
Yasui et al.

(10) Patent No.: US 9,889,831 B2
(45) Date of Patent: Feb. 13, 2018

(54) BRAKING CONTROL DEVICE FOR VEHICLE

(71) Applicants: ADVICS CO., LTD., Aichi (JP); TOYOTA JIDOSHA KABUSHIKI KAISHA, Aichi (JP); Yoshiyuki Yasui, Aichi (JP); Hiroyuki Kodama, Aichi (JP); Takuya Hirano, Aichi (JP); Naoki Yabusaki, Aichi (JP); Takayuki Yamamoto, Aichi (JP)

(72) Inventors: Yoshiyuki Yasui, Nagoya (JP); Hiroyuki Kodama, Kariya (JP); Takuya Hirano, Kariya (JP); Naoki Yabusaki, Toyota (JP); Takayuki Yamamoto, Nagakute (JP)

(73) Assignees: ADVICS CO., LTD., Kariya-Shi, Aichi (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 14/426,697

(22) PCT Filed: Sep. 4, 2013

(86) PCT No.: PCT/JP2013/073844
§ 371 (c)(1),
(2) Date: Mar. 6, 2015

(87) PCT Pub. No.: WO2014/038602
PCT Pub. Date: Mar. 13, 2014

(65) Prior Publication Data
US 2015/0224970 A1  Aug. 13, 2015

(30) Foreign Application Priority Data

Sep. 7, 2012  (JP) ................................ 2012-197245

(51) Int. Cl.
*B60T 8/00* (2006.01)
*B60T 8/1761* (2006.01)
(Continued)

(52) U.S. Cl.
CPC ............ *B60T 8/1761* (2013.01); *B60T 8/171* (2013.01); *B60T 8/172* (2013.01);
(Continued)

(58) Field of Classification Search
None
See application file for complete search history.

(56) References Cited

U.S. PATENT DOCUMENTS 8,082,087 B2 * 12/2011 Yasui .................. B60T 8/17552
701/74
8,577,531 B2 * 11/2013 Semsey ............... B60T 8/17555
188/71.5

(Continued)

FOREIGN PATENT DOCUMENTS

GB     2 366 341 A    3/2002
JP     6-072311 A     3/1994
(Continued)

OTHER PUBLICATIONS

International Search Report (PCT/ISA/210) dated Nov. 26, 2013, by the Japanese Patent Office as the International Searching Authority for International Application No. PCT/JP2013/073844.
(Continued)

*Primary Examiner* — James M McPherson
(74) *Attorney, Agent, or Firm* — Buchanan Ingersoll & Rooney PC

(57) ABSTRACT

A vehicle brake control device generates rear wheel braking torque by an electric motor by pressing a friction member against a rotating member rotating together with the rear wheel, reduces rear wheel braking torque by controlling the electric motor based on a target energization amount calculated from a slip state quantity of the rear wheel, and rapidly stops electric motor rotation motion based on an adjusted target energization amount calculated from the target energization amount and a slip state quantity of a front wheel.

9 Claims, 12 Drawing Sheets

(51) Int. Cl.
*B60T 13/74* (2006.01)
*B60T 8/171* (2006.01)
*B60T 8/172* (2006.01)

(52) U.S. Cl.
CPC ........ *B60T 8/17616* (2013.01); *B60T 13/741* (2013.01); *B60T 2240/06* (2013.01)

(56) References Cited

U.S. PATENT DOCUMENTS

| 2005/0046368 A1* | 3/2005 | Arakawa ............... B60T 13/741 318/370 |
| 2011/0060511 A1 | 3/2011 | Kim |

FOREIGN PATENT DOCUMENTS

| JP | 9-254764 A | 9/1997 |
| JP | 2002-104170 A | 4/2002 |
| JP | 2002-225690 A | 8/2002 |
| JP | 2005-069398 A | 3/2005 |
| JP | 2008-189173 A | 8/2008 |

OTHER PUBLICATIONS

Written Opinion (PCT/ISA/237) dated Nov. 26, 2013, by the Japanese Patent Office as the International Searching Authority for International Application No. PCT/JP2013/073844.

\* cited by examiner

BRAKING CONTROL DEVICE FOR VEHICLE

TECHNICAL FIELD

The present invention relates to a vehicle brake control device.

BACKGROUND ART

In Japanese Patent Application Laid-open No. Hei 09-254764, it is disclosed that, in anti-skid control (hereinafter also referred to as "ABS control") for individually adjusting braking hydraulic pressures of wheels laterally opposite to each other, for the purpose of preventing both the right and left wheels from simultaneously falling into a deeply locked state, "an ABS control threshold value is set for each of the wheels laterally opposite to each other, and when the ABS control is started on only one of the right and left wheels, a target slip ratio of the other wheel is reduced". As an effect thereof, it is disclosed that "when control of the braking hydraulic pressure is started on one of the wheels, the control of the braking hydraulic pressure is started on the other wheel before a locking tendency set in advance as a control start condition is determined. In accordance with the start of the ABS control, one of the wheels may fall into a relatively deeply locked state, but both the wheels are prevented from simultaneously falling into a deeply locked state, which ensures traveling stability of the vehicle".

Further, in Japanese Patent Application Laid-open No. 2002-225690, it is disclosed that, depending on a pedaled state of a brake pedal, an energization amount supplied to an actuator (electric motor) for generating a braking force is changed, and in a braking device for the vehicle for electrically conducting a braking operation, "an indicator current corresponding to a pedaled state of a brake pedal is calculated, a compensation current having a plus sign is added to the indicator current when the indicator current rises, a compensation current having a minus sign is added to the indicator current during a period from a time when the indicator current drops to a time when the indicator current shifts to a steady state, and the actuator for driving a brake is driven based on the indicator current to which the compensation current is added". As an effect thereof, it is disclosed that "It is possible to eliminate a delay in time of a braking torque ascribable to an inertia moment, an attenuation loss, and a friction loss of the actuator for driving the brake, and it is also possible to reduce an overshoot ascribable thereto".

SUMMARY OF INVENTION

In ABS control as disclosed in Japanese Patent Application Laid-open No. Hei 09-254764, an excessive wheel slip is suppressed, and a lateral force of a wheel is secured, which may maintain vehicle stability. In this case, in a hydraulic braking device using a brake fluid, an inertia of the fluid is small enough to be ignored. Accordingly, when a decompression instruction (instruction to reduce a braking torque) is issued, the braking torque may be reduced immediately. In contrast, in a braking device of an electric/mechanical type (so-called electric brake; referred to as "electro-mechanical brake (EMB)") for controlling the braking torque by using such an electric motor as disclosed in Japanese Patent Application Laid-open No. 2002-225690, it is difficult to immediately reduce the braking torque in response to the instruction to reduce the braking torque due to the inertia of the electric motor, a limitation of a speed (maximum rotation speed), and the like.

Now, this issue is described in detail with reference to FIG. 12. The upper chart of FIG. 12 shows an example of time-series variations of an operation amount Bpa of a braking operation member (brake pedal) operated by a driver and a target value Fbu and an actual value Fba of a pressing force of a friction member (brake pad). The lower chart of FIG. 12 shows a target value Imt of an energization amount supplied to the electric motor in this example.

In this example, at a time point to, a rapid operation of the braking operation member is started by the driver. At this time, in order to compensate for influences of the inertia of the electric motor or the like, inertia compensation control for calculating a "value obtained by adding a compensation current having a plus sign to a value corresponding to pedaling" as the target value Imt of the energization amount is executed over a period between time points t1 and t2. Because of this inertia compensation control, the actual value Fba is increased rapidly so as to follow the target value Fbu of the pressing force. Then, at a time point t3, the wheel slip is increased, and slip suppression control (anti-skid control) is started. That is, after the time point t3, the target value Fbu of the pressing force is immediately reduced rapidly in order to suppress the excessive wheel slip. However, the electric motor keeps moving (rotating) at high speed in order to rapidly increase the pressing force until the time point t3. Accordingly, after the time point t3, due to the influences of the inertia of the electric motor, the actual pressing force Fba may not be immediately reduced rapidly, and starts to be reduced with a delay from the time point t3. In addition, a decrease gradient (temporal change) of the Fba is subjected to the limitation of the maximum speed of the electric motor. As a result, there may occur a problem in that the wheel slip increases.

In particular, when the slip of the rear wheel becomes excessive, the vehicle stability deteriorates due to the fact that the lateral force of the rear wheel cannot be secured. Accordingly, in regard to the vehicle equipped with the above-mentioned braking device of the electric/mechanical type using the electric motor for the rear wheels, a device that may suppress the slip of the rear wheel from becoming excessive is particularly desired to be provided.

The present invention has been made in order to cope with the above-mentioned problems, and it is an object thereof to provide a vehicle brake control device for generating a braking torque of a rear wheel of a vehicle by an electric motor, which may suppress a slip of the rear wheel from becoming excessive due to influences of an inertia (inertia moment, inertia mass) or the like of the electric motor when execution of slip suppression control such as anti-skid control is started on the rear wheel.

According to one embodiment of the present invention, there is provided a vehicle brake control device, including: electric braking means (BRK) for generating a braking torque of a rear wheel (WH[r*]) of a vehicle through intermediation of an electric motor (MTR); wheel speed acquisition means (VWA) for acquiring speeds (Vwa[]) of four wheels (WH[]) of the vehicle; slip state quantity calculation means (SLP) for calculating, based on the speeds (Vwa[]) of the four wheels, a slip state quantity (Slp[]) indicating slip degrees of the four wheels of the vehicle; and control means (CTL) for calculating, based on a slip state quantity (Slp[r*]) of the rear wheel, a target energization amount (Imt) of the electric motor (MTR) in order to execute slip suppression control of the rear wheel for suppressing a slip of the rear wheel, and controlling the electric motor (MTR) for the rear wheel based on the target energization amount (Imt) (reducing the braking torque (pressing force) of the rear wheel.

The present invention has a feature in that the control means (CTL) is configured to adjust, based on a slip state quantity (Slp[f*]) of a front wheel, the target energization amount (Imt) in order to execute sudden-stop control for rapidly stopping (rapidly decelerating) a rotation motion of the electric motor (MTR) (in such a direction as to increase the braking torque of the rear wheel), and control the electric motor (MTR) for the rear wheel based on the adjusted target energization amount (Imt).

In this case, the sudden-stop control may be started on condition that the slip suppression control of the rear wheel is not being executed. Further, the present invention assumes "a configuration for adjusting, during braking of the vehicle, the braking torque applied to the rear wheel so that a ratio of a braking force generated in the front wheel to a vertical load acting on the front wheel becomes larger than a ratio of a braking force generated in the rear wheel to a vertical load acting on the rear wheel". Note that, normally, the control means (CTL) may be configured to adjust the target energization amount (Imt) of the electric motor (MTR) for the rear wheel to a value corresponding to an operation amount (Bpa) of a braking operation member (BP) operated by the driver of the vehicle.

In general, during the braking of the vehicle (that is, during deceleration), the braking torques of the four wheels are set based on respective specifications so that a braking load on the front wheel (ratio of the braking force of the wheel to the vertical load thereon, that is, value obtained by dividing the braking force generated in the wheel by the vertical load acting on the wheel) becomes larger than a braking load on the rear wheel. In this case, the slip degree (extent of slipping) of the front wheel becomes larger than the slip degree of the rear wheel. Accordingly, in a case where the braking operation member is rapidly operated by the driver, the slip degree of the front wheel increases faster than the slip degree of the rear wheel. According to the above-mentioned feature of the present invention, the sudden-stop control of the electric motor for adjusting the braking torque of the rear wheel is started/executed based on the slip state quantity of the front wheel. Accordingly, compared to a case where the sudden-stop control is started/executed based on the slip state quantity of the rear wheel, it is possible to decelerate/stop at an earlier stage the rotation motion of the electric motor that is rotationally moving at high speed in such a direction as to rapidly increase the braking torque (pressing force) of the rear wheel (in response to the abrupt operation of the braking operation member made by the driver). As a result, also when the slip suppression control of the rear wheel is started immediately after that, the braking torque (pressing force) of the rear wheel may be immediately reduced rapidly by immediately rotating the electric motor reversely. As a result, the slip of the rear wheel may be reliably suppressed from becoming excessive.

The above-mentioned brake control device according to one embodiment of the present invention may further include hydraulic braking means (HU, BRH) for generating a braking torque of the front wheel (WH[r]) by way of a braking hydraulic pressure, and may be configured to reduce, based on the slip state quantity (Slp[f*]) of the front wheel, the braking hydraulic pressure of the front wheel in order to execute the slip suppression control of the front wheel for suppressing a slip of the front wheel.

In this case, it is preferred that the control means (CTL) be configured to: start the sudden-stop control when the slip degree of the front wheel indicated by the slip state quantity (Slp[f*]) of the front wheel exceeds a first degree (vsq1, dvq1); and start the slip suppression control of the front wheel when the slip degree of the front wheel indicated by the slip state quantity (Slp[f*]) of the front wheel exceeds a second degree (vsb1, dvb1) that is larger than the first degree (vsq1, dvq1).

With this, in the case where the braking operation member is rapidly operated by the driver, the sudden-stop control may be started at a stage before the slip suppression control of the front wheel is started, that is, at a stage where the slip degree of the front wheel increases slightly. As described above, at this stage, the slip degree of the rear wheel has not increased yet. Accordingly, the rotation motion of the electric motor that is rotationally moving at high speed in such a direction as to rapidly increase the braking torque (pressing force) of the rear wheel may be reliably decelerated/stopped at an early stage. As a result, even when the slip suppression control of the rear wheel is started immediately after that, the electric motor may be immediately rotated reversely, and hence the slip of the rear wheel may be more reliably suppressed from becoming excessive. Note that, as a typical pattern of the case where the braking operation member is rapidly operated by the driver, the "pattern in which the sudden-stop control of the electric motor for the rear wheel is first started, the slip suppression control of the front wheel is then started, and then the slip suppression control of the rear wheel is started" may be assumed.

As the sudden-stop control, "control of changing the target energization amount (Imt) of the electric motor (MTR) stepwise to an energization limit value (imm) set in advance corresponding to a deceleration direction of the electric motor (such a direction as to reduce the braking torque of the rear wheel) when the starting of the sudden-stop control is determined" may be executed. Therefore, a large torque in the deceleration direction acts on the electric motor to rapidly decelerate/rapidly stop the electric motor. In this case, the energization limit value (imm) may be determined based on a maximum value of a current to be supplied to at least one of the electric motor (MTR) or a driving circuit (DRV) of the electric motor.

Alternatively, as the sudden-stop control, "control of setting the target energization amount (Imt) to zero when the starting of the sudden-stop control is determined, and establishing a short circuit between terminals (between Ts-Tb, between Tu-Tv-Tw) of the electric motor (MTR). Therefore, a so-called dynamic brake (hereinafter also referred to as "rheostatic brake") acts to rapidly decelerate/rapidly stop the electric motor.

In the case where the above-mentioned brake control device according to one embodiment of the present invention further includes motor speed acquisition means (DMK) for acquiring a speed (dMk) of the electric motor (MTR), the control means may be configured to start the sudden-stop control on condition that the speed (dMk) of the electric motor is equal to or higher than a first predetermined speed (dMk1). In this case, the control means may be configured to terminate the sudden-stop control when the speed (dMk) of the electric motor becomes lower than a second predetermined speed (dMk2) that is lower than the first predetermined speed (dMk1). Those configurations are based on the fact that the influences of the inertia of the electric motor become larger as the speed (rotation speed) of the electric motor becomes higher. The speed dMk of the electric motor may be acquired by subjecting a position (rotor position) Mka of the electric motor acquired by position acquisition means MKA to time differentiation.

DESCRIPTION OF EMBODIMENTS

Now, a vehicle brake control device according to embodiments of the present invention is described with reference to the drawings. Note that, a suffix [**] appended to the end of each kind of symbol or the like indicates which of the four wheels each kind of symbol or the like relates to. [fl] indicates the left-front wheel, [fr] indicates the right-front wheel, [rl] indicates the left-rear wheel, and [rr] indicates the right-rear wheel. The suffix [f*] indicates what relates to any one of the front wheels, and the suffix [r*] indicates what relates to any one of the rear wheels. Further, in a case where the suffix is [] (including a case where there is no suffix due to omission of []), each kind of symbol relating to the four wheels generically indicates the four wheels. In a case where the suffix is [f*] (including a case where there is no suffix due to omission of [f*]), each kind of symbol relating to the front wheel generically indicates the front wheels. Further, in a case where the suffix is [r*] (including a case where there is no suffix due to omission of [r*]), each kind of symbol relating to the rear wheel generically indicates the rear wheels. For example, VWA[**] and VWA generically indicate wheel speed acquisition means for the four wheels, BRH[f*] and BRH generically indicate hydraulic braking means for the front wheel, and BRK[r*] and BRK generically indicate electric braking means for the rear wheel.

<Overall Configuration of Vehicle equipped with Vehicle Brake Control Device According to Embodiments of Present Invention>

Figure 1:
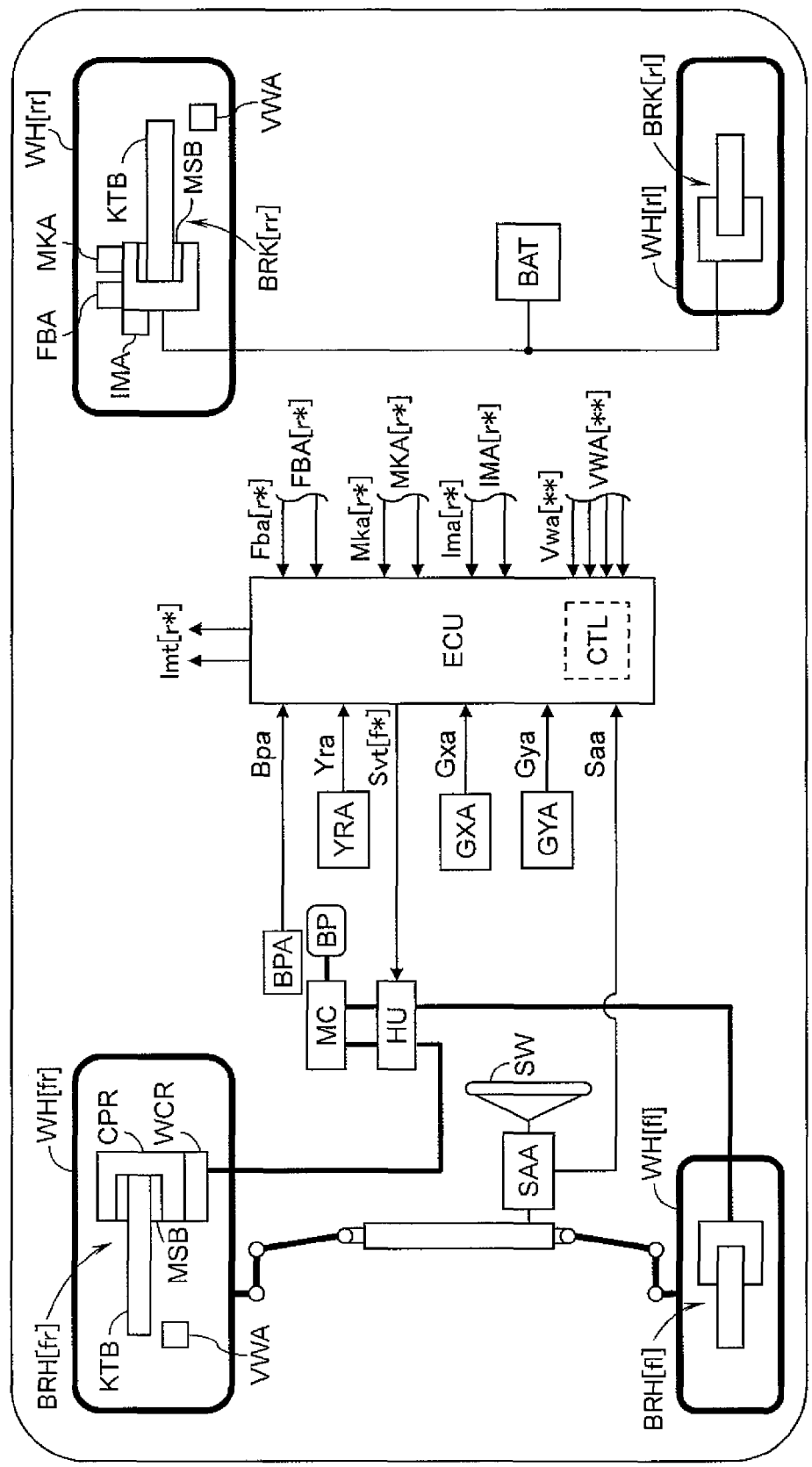
FIG. 1 is a schematic configuration diagram of a vehicle equipped with a brake control device according to embodiments of the present invention.

As illustrated in FIG. 1, this vehicle is equipped with a braking operation member (for example, brake pedal) BP that is operated by a driver to decelerate the vehicle, a master cylinder MC (part of hydraulic braking means BRH to be described later) for generating a braking hydraulic pressure in accordance with an operation of the BP, the hydraulic braking means for the front wheel (hydraulic brake actuator for the front wheel) BRH for adjusting a braking torque by the braking hydraulic pressure of a vehicle-forward wheel (front wheel) WH[r] in accordance with a hydraulic pressure generated by the master cylinder MC (master cylinder pressure) to generate a braking force in the front wheel, a hydraulic unit HU (part of the hydraulic braking means BRH) for adjusting the braking hydraulic pressure of the front wheel independently of the master cylinder pressure, the electric braking means for the rear wheel (electric brake actuator for the rear wheel) BRK for adjusting the braking torque of a vehicle-backward wheel (rear wheel) WH[r*] to generate the braking force in the rear wheel, an electronic control unit ECU for controlling the HU and the BRK, and a storage battery BAT serving as a power supply for supplying electric power to the HU, the BRK, the ECU, and the like.

In addition, this vehicle includes braking operation amount acquisition means (such as stroke sensor, pedal-force sensor, and master cylinder pressure sensor) BPA for detecting an operation amount Bpa of the BP, steering angle detection means SAA for detecting a steering angle Saa of a steering wheel SW operated by the driver, yaw rate detection means YRA for detecting a yaw rate Yra of the vehicle, longitudinal acceleration detection means GXA for detecting a vehicle longitudinal acceleration Gxa, lateral acceleration detection means GYA for detecting a vehicle lateral acceleration Gya, and wheel speed detection means VWA for detecting a rotation speed (wheel speed) Vwa of each wheel WH[**]. Each of the detected values may be acquired from another system (another electronic control unit) through a communication bus.

The hydraulic braking means for the front wheel BRH[f*] includes a brake caliper CPR, a wheel cylinder WCR, and friction members (for example, brake pads) MSB that are known. The MSBs are pressed against a rotating member (for example, brake rotor) KTB that is known by the braking hydraulic pressure to cause frictional forces, thereby generating a braking torque at the front wheel WH[r] to generate a braking force of the front wheel.

The electric braking means for the rear wheel BRK[r*] includes an electric motor MTR[r*] (not shown) and the braking torque of the wheel WH[r*] is controlled by the MTR. In addition, the BRK includes pressing force acquisition means (for example, axial force sensor) FBA[r*] for detecting a pressing force Fba[r*] of a friction member MSB to press a rotating member KTB, energization amount acquisition means (for example, current sensor) IMA[r*] for detecting an energization amount (for example, current value) Ima[r*] to the MTR[r*], and position acquisition means (for example, rotation angle sensor) MKA[r*] for detecting a position (for example, rotation angle) Mka[r*] of the MTR.

The above-mentioned detection signals (such as Bpa) that are detected by the various detection means are subject to noise removal (reduction) filtering (for example, low-pass filtering) and then are supplied to the ECU. In the ECU, arithmetic processing for the brake control related to the present invention is executed. That is to say, control means CTL to be described later is programmed in the ECU, and a target energization amount (for example, target current value or target duty ratio) Imt[r] for controlling the electric motor MTR is calculated based on the Bpa and the like. In addition, based on the Vwa[**], the Yra, and the like, in the ECU, arithmetic processing is executed for anti-skid control (ABS), traction control (TCS), vehicle stabilization control (ESC), and the like.

The hydraulic unit HU (part of the hydraulic braking means BRH) includes a solenoid valve, a hydraulic pump, and an electric motor (not shown). Then, a wheel cylinder pressure (pressure for pressing the MSB) of the hydraulic braking means for the front wheel BRH is controlled based on instruction signals (drive signals for the solenoid valve and the electric motor) Svt for anti-skid control, traction control, vehicle stabilization control, and the like that are calculated in the ECU.

<Configuration of Electric Braking Means for Rear Wheel (Brake Actuator)>

In the brake control device according to the embodiments of the present invention, the electric motor MTR[r] generates and adjusts the braking torque of the vehicle-backward wheel (rear wheel) WH[r*].

Figure 2:
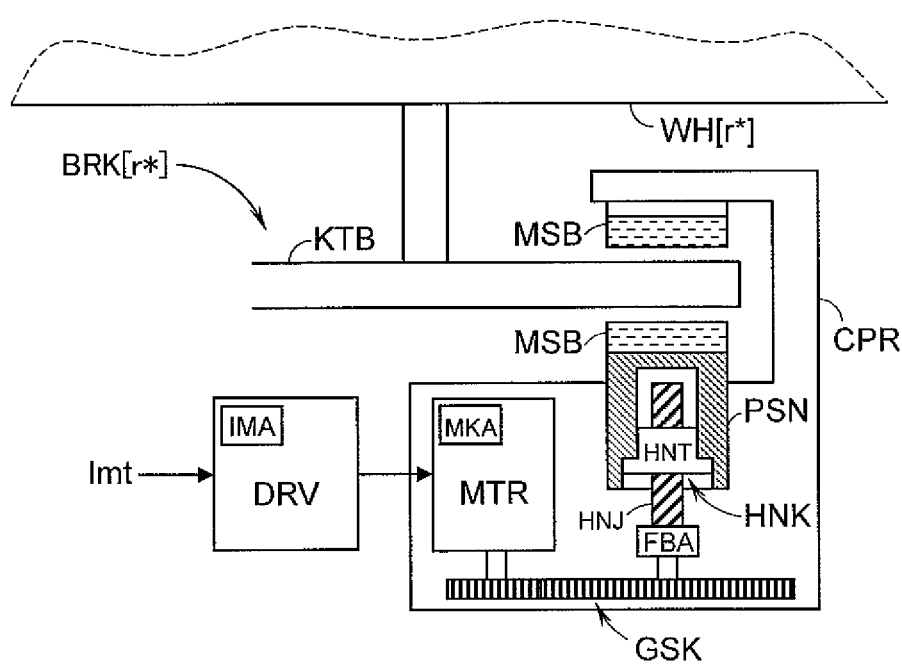
FIG. 2 is a diagram illustrating a configuration of braking means (brake actuator) for a rear wheel illustrated in FIG. 1.

As illustrated in FIG. 2, the electric braking means for the rear wheel BRK includes a brake caliper CPR, the rotating member KTB, the friction member MSB, the electric motor MTR, driving means (electric circuit driving MTR) DRV, a decelerator GSK, a rotation/linear motion conversion mechanism HNK, the pressing force acquisition means FBA, the position acquisition means MKA, and the energization amount acquisition means IMA.

Similarly to the known braking device, the electric brake for the rear wheel actuator BRK includes the brake caliper CPR and the friction members (for example, brake pads) MSB that are known. The MSBs are pressed against the rotating member (for example, brake rotor) KTB that is known to cause frictional forces, thereby generating a braking torque at the rear wheel WH[r*] to generate a braking force of the rear wheel.

In the driving means (driving circuit of the electric motor MTR) DRV, based on the target energization amount (target value) Imt, an energization amount (finally, current value) to the electric motor MTR is controlled. Specifically, in the driving means DRV, a bridge circuit that uses switching elements (power transistors, for example, MOS-FETs) is formed, and the switching elements are driven based on the target energization amount Imt to control the output of the electric motor MTR.

The output (output torque) of the electric motor MTR is transmitted, by way of the decelerator (for example, gear sets) GSK, to the rotation/linear motion conversion mechanism HNK. Then, the HNK converts a rotation motion into a linear motion, and the linear motion urges a piston PSN to move forward toward the rotating member (brake disc) KTB. Then, the piston PSN presses the friction member (brake pad) MSB toward the KTB, and hence the friction members MSBs are pressed against the rotating member KTB. The KTB is fixed to the wheel WH[r*], and the friction between the MSB and the KTB generates and adjusts the braking torque at the wheel WH[r*].

As the rotation/linear motion conversion mechanism HNK, a sliding screw (for example, trapezoidal screw) that uses "sliding" for power transmission (sliding transmission) is available. A screw HNJ is rotated, and a nut HNT engaged therewith is advanced to or retracted from the KTB in linear motion. As the HNK, a ball screw for transmitting power by "rolling" (rolling transmission) may be used.

The motor driving circuit DRV includes the energization amount acquisition means (for example, current sensor) IMA for detecting the actual energization amount (for example, actual current flowing to the electric motor) Ima. In addition, the electric motor MTR is equipped with the position acquisition means (for example, angle sensor) MKA for detecting the position (for example, rotation angle) Mka of the rotor. Further, the pressing force acquisition means (for example, pressing force sensor) FBA is provided for detecting the force (actual pressing force) Fba with which the friction member MSB actually presses the rotating member KTB.

In FIG. 2, a so-called disc type braking device (disc brake) is illustrated as an exemplary configuration of the electric braking means BRK, but the braking means BRK may be in the form of a drum type braking device (drum brake). In the case of the drum brake, the friction member MSB is a brake shoe and the rotating member KTB is a brake drum. Similarly, the force with which the brake shoe presses the brake drum (pressing force) is controlled by the electric motor MTR. As the electric motor MTR, a device that generates a torque by rotation motion is exemplified, but a linear motor is available that generates a force by linear motion.

<Configuration of Driving Means DRV (Motor with Brush)>

Figure 3:
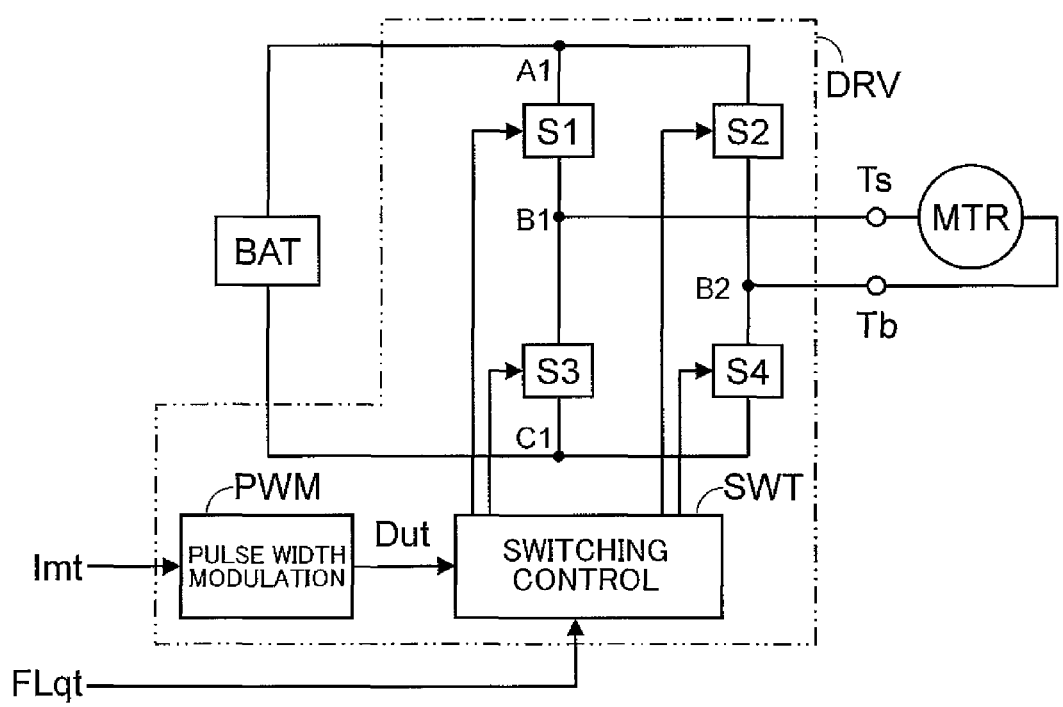
FIG. 3 is a driving circuit diagram illustrating an example of driving means for an electric motor (motor with a brush) illustrated in FIG. 2.

FIG. 3 illustrates an example of the driving means (driving circuit) DRV in a case where the electric motor MTR is a motor with a brush (hereinafter also referred to simply as "brush motor"). The DRV is an electric circuit for driving the MTR, and includes switching elements S1 to S4, a pulse width modulation block PWM for performing pulse width modulation (PWM) based on the Imt, and a switching control block SWT for controlling an energized state/non-energized state of the S1 to S4 based on a duty ratio determined by the PWM.

The switching elements S1 to S4 are elements capable of turning on/off a part of the electric circuit, and, for example, a MOSFET may be used. The S1 to S4 form a bridge circuit for the MTR in a forward direction (rotational direction for causing the MSB to approach the KTB and increasing the braking torque) and a reverse direction (rotational direction for pulling the MSB away from the KTB and decreasing the braking torque). By the switching control block SWT, in the forward direction, the S1 and S4 are controlled in the energized state (on state) and the S2 and S3 are controlled in the nonenergized state (off state). Further, in the reverse direction, the S1 and S4 are controlled in the nonenergized state (off state) and the S2 and S3 are controlled in the energized state (on state).

In the PWM, the duty ratio (ratio of on/off time) of the pulse width is determined based on a magnitude of the Imt, and the rotational direction of the MTR is determined based on the sign (plus sign or minus sign) of the Imt. For example, the rotational direction of the MTR may be set as the forward direction with a positive (plus) value and the reverse direction with a negative (minus) value. A final output voltage is determined based on an input voltage (voltage of the BAT) and the duty ratio, and hence the rotational direction and the output torque of the MTR are controlled by the DRV.

<Configuration of Driving Means DRV (Three-Phase Brushless Motor)>

Figure 4:
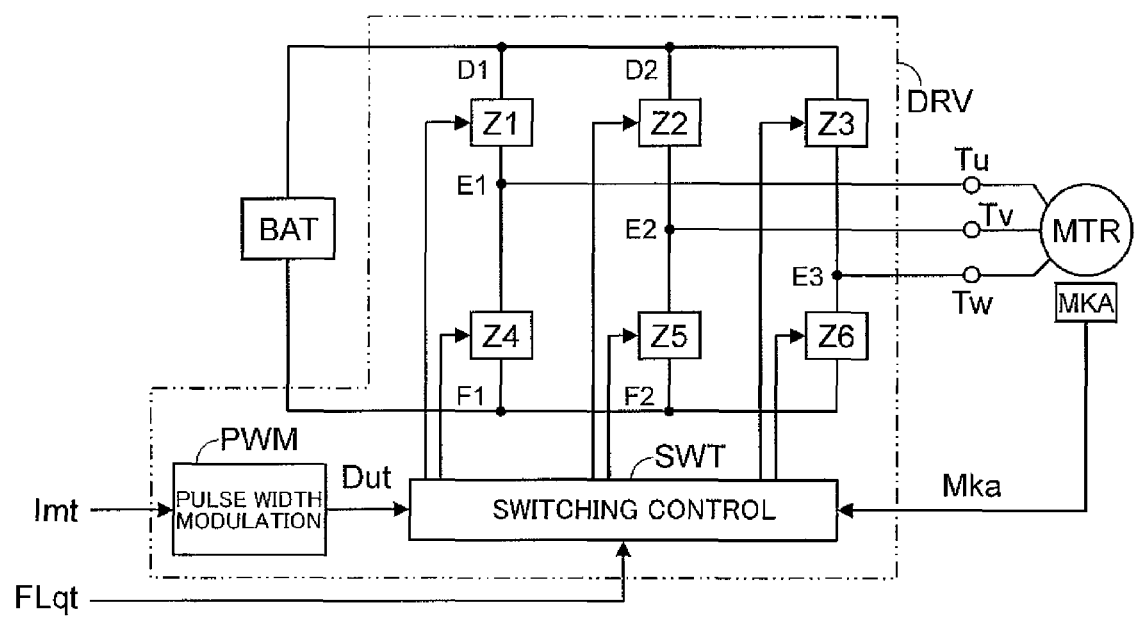
FIG. 4 is a driving circuit diagram illustrating an example of driving means for an electric motor (brushless motor) illustrated in FIG. 2.

FIG. 4 illustrates an example of the driving means (driving circuit) DRV in a case where the electric motor MTR is a brushless motor. The DRV is an electric circuit for driving the MTR, and includes switching elements Z1 to Z6, the pulse width modulation block PWM for performing the pulse width modulation based on the Imt, and the switching control block SWT for controlling an energized state/non-energized state of the Z1 to Z6 based on the duty ratio determined by the PWM.

In the brushless motor, the rotor position (rotation angle) Mka of the MTR is acquired by the position acquisition means MKA. Then, based on the Mka, directions of coil energization amounts in a U phase, a V phase, and a W phase (that is, excitation directions) are switched in order by the Z1 to Z6 controlled by the SWT, to thereby drive the MTR. The rotational direction (forward direction or reverse direction) of the brushless motor is determined from a relationship between the rotor and a position for the excitation.

Also in the brushless motor, in the same manner as in the brush motor, in the PWM, the duty ratio of the pulse width is determined based on the magnitude of the Imt, and the rotational direction of the MTR is determined based on the sign (plus/minus of the value) of the Imt. Then, based on the target energization amount Imt, the switching elements Z1 to Z6 are controlled based on the signal from the SWT, and hence the rotational direction and the output torque of the MTR are controlled.

<Overall Configuration of Control Means>

Figure 5:
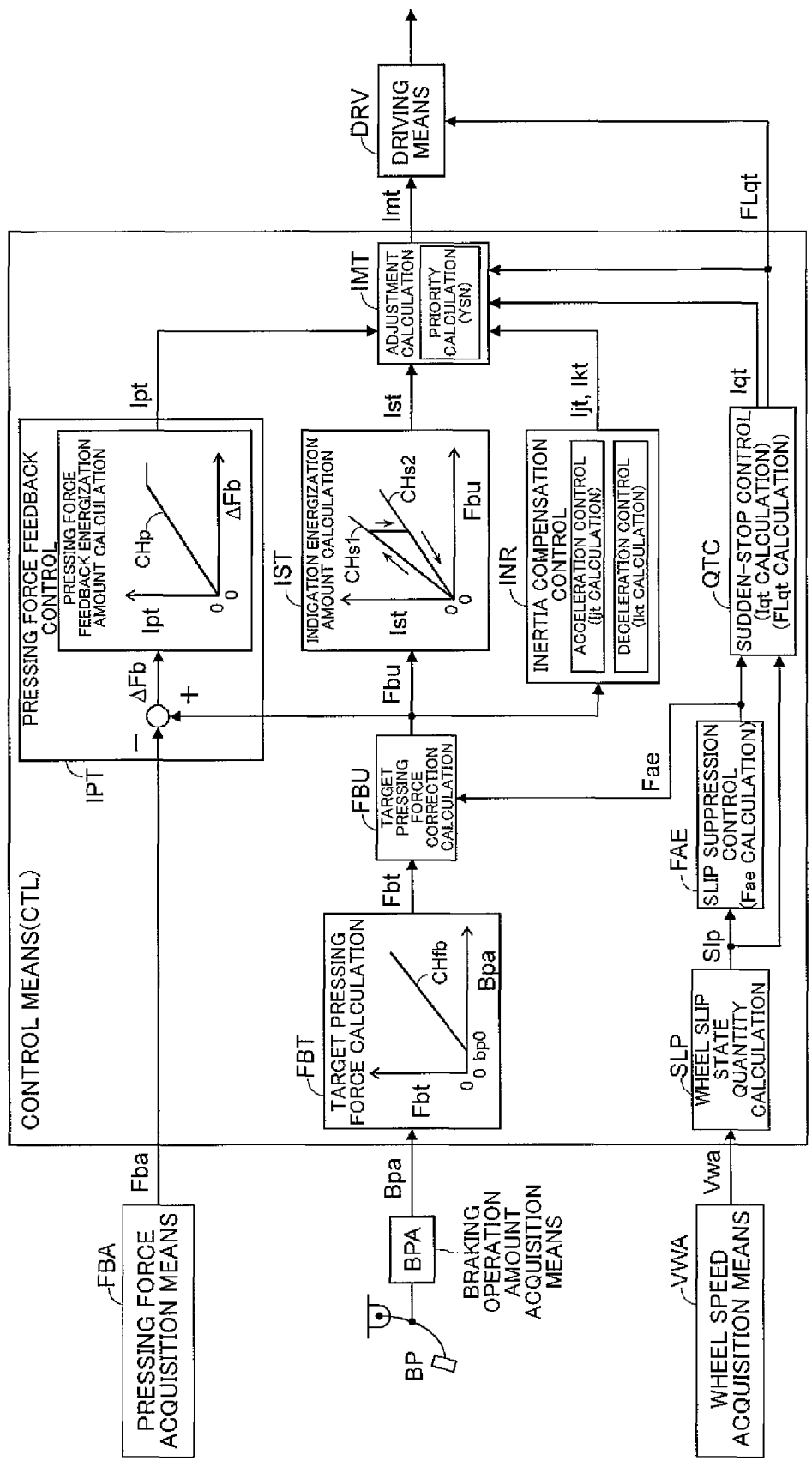
FIG. 5 is a functional block diagram of control means illustrated in FIG. 1.

As illustrated in FIG. 5, the control means CTL includes a target pressing force calculation block FBT, a target pressing force correction calculation block FBU, an indication energization amount calculation block IST, a pressing force feedback control block IPT, an inertia compensation control block INR, a wheel slip state quantity calculation block SLP, a slip suppression control block FAE, a sudden-stop control block QTC, and an energization amount adjustment calculation block IMT. The control means CTL is programmed in the electronic control unit ECU.

The operation amount Bpa of the braking operation member BP (for example, brake pedal) is acquired by the braking operation amount acquisition means BPA. The operation amount of the braking operation member (braking operation amount) Bpa is calculated based on the pressure of the MC (master cylinder pressure), and also may be calculated based on at least one of an operation force of the braking operation member (for example, brake pedal force) operated by the driver or a displacement amount (for example, brake pedal stroke) thereof. The Bpa is subject to calculation processing using a low-pass filter or the like for noise component removal (reduction).

In the target pressing force calculation block FBT, a preset target pressing force calculation characteristic (calculation map) CHfb is used for calculating the target pressing force Fbt for each rear wheel based on the operation amount Bpa. The "pressing force" is a force (pressing pressure) with which the friction member (for example, brake pad) MSB presses the rotating member (for example, brake disc) KTB in the electric braking means (brake actuator) BRK. The target pressing force Fbt is a target value of the pressing force.

In the calculation map CHfb, with respect to so-called "ideal braking force distribution", braking force distribution of front and rear wheels is set to achieve such a characteristic that a degree of the braking force of the front wheel relative to a vertical load (normal force, or force exerted from a road surface in a vertical direction) becomes larger than a degree of the braking force of the rear wheel relative to a vertical load. During braking of the vehicle, the vertical load (also referred to as "grounding load") moves from the rear wheel to the front wheel. That is, the vertical load on the rear wheel decreases, and the vertical load on the front wheel increases. The "ideal braking force distribution" represents such a characteristic that, in consideration of this vertical load movement, a ratio of a front-wheel braking force to a front-wheel vertical load (referred to as "front-wheel braking load") becomes equal to a ratio of a rear-wheel braking force to a rear-wheel vertical load (referred to as "rear-wheel braking load"). The CHfb is set so that the front-wheel braking load becomes larger than the rear-wheel braking load. For example, the CHfb may be set so that the Fbt is increased in a "concave-down" manner as the Bpa increases.

In the target pressing force correction calculation block FBU, the target pressing force Fbt is corrected based on the calculation result (such as Fae) from the slip suppression control block FAE to be described later. In the FAE, slip suppression control such as the anti-skid control is executed. Then, based on a corrected pressing force Fae, the target pressing force Fbt calculated based on the operation of the brake pedal BP by the driver is interrupted, and a target pressing force Fbu corrected in order to suppress an excessive wheel slip (locking tendency of the wheel) is calculated.

The indication energization amount calculation block IST calculates, by using preset calculation maps CHs1 and CHs2, an indication energization amount Ist based on the target pressing force Fbu corrected by the Fae. The indication energization amount Ist is a target value of the energization amount of the electric motor MTR, which is used for driving the electric motor MTR of the braking means for the rear wheel BRK to achieve the corrected target pressing force Fbu. Taking into consideration of the hysteresis of the brake actuator, the calculation map (calculation characteristics for indication energization amount) has the two characteristics CHs1 and CHs2. The characteristic (first indication energization amount calculation characteristic) CHs1 is for coping with an increase of the pressing force, while the characteristic (second indication energization amount calculation characteristic) CHs2 is for coping with a decrease of the pressing force. For this reason, the characteristic CHs1 is set so as to output a relatively large indication energization amount Ist as compared to the characteristic CHs2.

As used herein, the energization amount is a state amount (variable) for controlling an output torque of the electric motor MTR. Due to the fact that the torque output from the electric motor MTR is almost in proportion to a current supplied thereto, a current target value of the electric motor is available as a target value of the energization amount. In addition, when a voltage supplied to the electric motor MTR is increased, the resultant current is increased, and hence a supply voltage value is available as the target energization amount. Moreover, a duty ratio in pulse width modulation (PWM) makes it possible to adjust the supply voltage value, and hence this duty ratio is available as the energization amount.

In the pressing force feedback control block IPT, a pressing force feedback energization amount Ipt is calculated based on the target pressing force (target value) Fbu and the actual pressing force (actual value) Fba. The indication energization amount Ist is calculated as a value that corresponds to the target pressing force Fbu, but an efficiency variation of the brake actuator may cause an error (steady error) between the target pressing force Fbu and the actual pressing force Fba. The pressing force feedback energization amount Ipt is calculated and determined to decrease the above-mentioned error (steady error) based on a deviation (pressing force deviation) ΔFb between the target pressing force Fbt and the actual pressing force Fba and a calculation characteristic (calculation map) CHp. The Fba is acquired by the pressing force acquisition means FBA.

In the inertia compensation control block INR, the influence of the inertia (inertia moment in rotation motion or inertia mass in linear motion) of the BRK (particularly, electric motor MTR) is compensated for. In the inertia compensation control block INR, target values Ijt and Ikt of the energization amount for compensating for the influence of the inertia (inertia moment or inertia mass) of the BRK are calculated. It is necessary to improve a responsiveness of pressing force generation in a case where the motion (rotation motion) of the electric motor is brought into acceleration from a state in which the electric motor is at rest or in motion at low speed. To cope with such a case, an acceleration inertia compensation energization amount Ijt is calculated. The Ijt is a target value of the energization amount of the control during acceleration in the inertia compensation control.

In addition, in a case where the electric motor is brought into deceleration to stop from the state in which the electric motor is in motion (rotation motion), it is also necessary to improve the convergence by suppressing the overshoot of the pressing force. To cope with such a case, a deceleration inertia compensation energization amount Ikt is calculated. The Ikt is a target value of the energization amount of the control during deceleration in the inertia compensation control. As used herein, the Ijt is a value (a value having a plus sign added to the Ist) for increasing the energization amount of the electric motor, while the Ikt is a value (a value having a minus sign added to the Ist) for decreasing the energization amount of the electric motor.

In the wheel slip state quantity calculation block SLP, a slip state quantity Slp[] of each wheel is calculated based on a wheel speed Vwa[] of each wheel acquired by the wheel speed acquisition means VWA[**]. The Slp represents a state quantity indicating a slip degree of each wheel. For example, as the Slp, a difference between the wheel speed Vwa and a vehicle speed (vehicle body speed) Vso is calculated as a wheel slip speed Vsl. Further, a wheel acceleration dVw representing a time variation amount of the Vwa may be calculated as the Sip.

In the slip suppression control block FAE, based on the slip state quantity Slp[**] of each wheel, the slip suppression control is executed for the rear wheel. The slip suppression control is control for suppressing an excessive slip of the wheel, and is the anti-skid control (ABS control) or braking force distribution control (EBD control). The ABS control typically represents control for reducing the braking torque applied to the wheel when the slip degree of the wheel exceeds a predetermined degree. The EBD control typically represents control for maintaining the braking torque applied to the wheel when the slip degree of the wheel exceeds a predetermined degree.

In the slip suppression control block FAE, the corrected pressing force (corrected value) Fae for correcting the target pressing force Fbt determined based on the Bpa is calculated. When the wheel slip increases (when the wheel approaches the locking tendency), the corrected pressing force Fae is calculated so as to interrupt the influences of the Fbt (independently of the braking operation by the driver in the calculation of the target pressing force) and reduce the corrected target pressing force (target value) Fbu. Further, when the wheel slip decreases due to the reduction of the Fbu (when grip of the wheel is recovered), the corrected pressing force Fae is calculated so as to increase the Fbu.

In the sudden-stop control block QTC, a target value (sudden-stop energization amount) Iqt of an energization amount of sudden-stop control is calculated based on the slip state quantity Slp[f*] of the front wheel. The sudden-stop control is control for urgently stopping the rotation motion by rapid deceleration thereof with maximum capability of the electric motor MTR in order to suppress an excessive slip (locking tendency of the wheel) ascribable to a delay in an actual value Fba following a target value Fbu. Therefore, in the QTC, the maximum amount (energization limit value) imm that may be subjected to the energization in the rotational direction (reverse direction) of the electric motor corresponding to the direction for pulling the friction member MSB away from the rotating member KTB (direction in which the braking torque decreases) is indicated stepwise (discontinuously with respect to the Imt so far, in a stepped manner, and instantaneously) as the target value (sudden-stop energization amount) Iqt of the energization amount in the sudden-stop control. The energization limit value imm is set in advance based on the value corresponding to the maximum current or the like of the MTR or the DRV.

In the energization amount adjustment calculation block IMT, the target energization amount Imt, which is a final target value of the MTR, is calculated. The indication energization amount Ist is adjusted by the pressing force feedback energization amount Ipt, the inertia compensation energization amounts Ijt (during acceleration) and Ikt (during deceleration), and the sudden-stop energization amount Iqt, to thereby calculate the target energization amount Imt.

The IMT includes a priority calculation block YSN, in which inertia compensation control and the sudden-stop control are prioritized. In the priority calculation block YSN, the Iqt is output with a higher priority than the Ijt and the Ikt. That is, when the Iqt is input simultaneously with the Ijt and the Ikt, the Ijt and the Ikt are set to zero, and the sudden-stop energization amount Iqt is output.

Specifically, in the energization amount adjustment calculation block IMT, the feedback energization amount Ipt is added to the indication energization amount Ist, any one of the inertia compensation energization amounts Ijt and Ikt and the sudden-stop energization amount Iqt is further added thereto, and a total sum thereof is calculated as the target energization amount Imt. In this case, the Iqt is a value for decreasing the energization amount of the electric motor (a value having a minus sign added to the Ist). The target energization amount Imt is a target value of a final energization amount for controlling the output from the electric motor MTR. The rotational direction of the MTR is controlled based on the sign (plus/minus of the value) of the Imt, and the output from the MTR is controlled based on the magnitude of the Imt.

The embodiment in which a "pressing force" representing a pressing pressure of the friction member MSB against the rotating member KTB is used as a control variable (state quantity to be controlled) has been described above. Specifications (rigidity of the CPR, gear ratio of the GSK, lead of the HNK, and the like) of the BRK are known. Therefore, a "pressing force corresponding value Fbs (target value Fst, actual value Fsa)" representing a value corresponding to a pressing force (pressing pressure) exerted on the rotating member KTB by the friction member MSB may be used as the control variable in place of the pressing force (target value Fbu, actual value Fba).

The pressing force corresponding value Fbs may be determined based on the state quantity relating to the "force" indicating an actuation state of a movable member located in a power transmission path from the electric motor MTR to the friction member MSB. For example, an actual output torque (or target value) of the electric motor, an actual output torque (or target value) of the GSK, an actual thrust (or target value) at the HNK, an actual thrust (or target value) at the PSN, and an actual pressing force (or target pressing force Fbu) of the MSB may be employed as the Fbs relating to the "force (torque)".

A rigidity (spring constant) of the entire BRK including the brake caliper CPR is known, and hence the state quantity relating to the "position" may be set as the Fbs in place of the state quantity relating to the above-mentioned "force". For example, the actual position Mka (or target position Mkt) of the electric motor, an actual position (or target position) of the GSK, an actual position (or target value) at the HNK, an actual position (or target value) at the PSN, and an actual position (or target value) of the MSB may be employed as the Fbs relating to the "position".

Further, a final pressing force corresponding value Fbs may be determined based on the Fbs of a plurality of movable members. Therefore, the "pressing force corresponding value Fbs (target pressing force corresponding value Fst, actual pressing force corresponding value Fsa)" may be determined based on at least any one of the state quantities relating to the "force" or the "position" of the movable member located in the power transmission path starting from the output torque of the MTR to reach the pressing force of the MSB against the KTB.

<Configuration of Inertia Compensation Control Block of First Embodiment>

Figure 6:
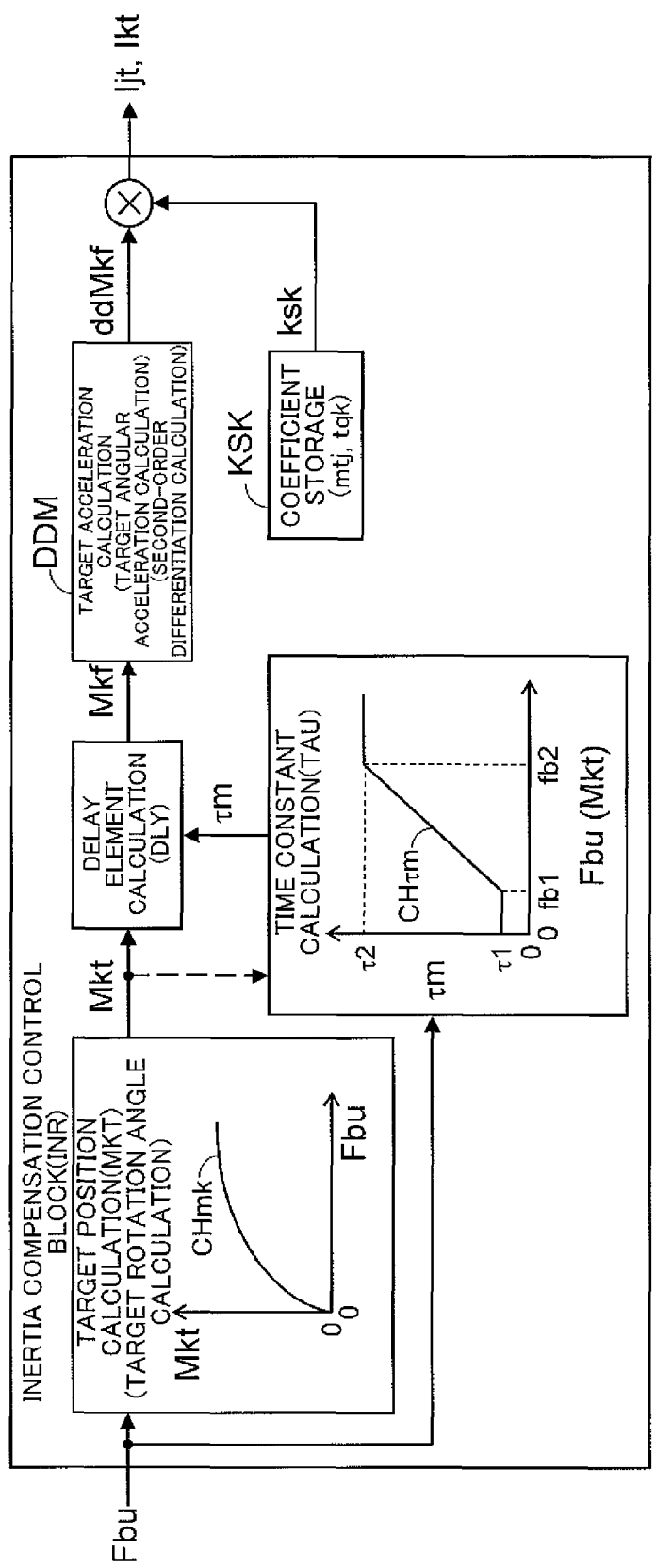
FIG. 6 is a functional block diagram illustrating an inertia compensation control block of a first embodiment illustrated in FIG. 5.

With reference to FIG. 6, an inertia compensation control block INR according to a first embodiment of the present invention is described. In the inertia compensation control block INR of the first embodiment, the inertia compensation control for improving responsiveness and convergence of the pressing force ascribable to an inertia of the MTR and the like (inertia of the entire BRK including the inertia of the MTR) is executed. The inertia compensation control block INR includes a target position calculation block MKT, a time constant calculation block TAU, a delay element calculation block DLY, a target acceleration calculation block DDM, and a coefficient storage block KSK.

The target position calculation block MKT calculates the target position (target rotation angle) Mkt based on the target pressing force Fbu and a target pressing force calculation characteristic (calculation map) CHmk. The target position Mkt is a target value of the position (rotation angle) of the electric motor MTR. The calculation map CHmk shows a characteristic corresponding to a rigidity of the brake caliper CPR and the friction members (brake pads) MSB and is stored in advance in the electronic control unit ECU as a non-linear characteristic which is "concave-down".

In the time constant calculation block TAU, the time constant τm is calculated based on the corrected target pressing force (target value of the pressing force) Fbu and a calculation characteristic (calculation map) CHτm for the time constant. When the Fbu is less than a predetermined operation amount (predetermined value) fb1, the τm is calculated as a first predetermined time constant (predetermined value) τ1 (≥0). When the Fbu is equal to or larger than a predetermined value fb1 and less than a predetermined value fb2, the τm is calculated so as to increase gradually from the first predetermined time constant τ1 to a second predetermined time constant τ2 in accordance with an increase of the Fbu. When the Fbu is equal to or larger than the predetermined value fb2, the τm is calculated as the second predetermined time constant (predetermined value) τ2 (>τ1).

In the delay element calculation block DLY, a target position (target rotation angle) Mkf after delay element calculation processing is calculated based on the target position Mkt of the electric motor MTR. Specifically, calculation processing for a delay element including the time constant τm corresponding to a response of the brake actuator BRK (that is, response of the electric motor MTR) is executed for the target position Mkt of the electric motor, to thereby calculate the target position Mkf after delay element processing. In this case, the delay element calculation processing is calculation of an n-th order delay element ("n" is an integer of "1" or more), and examples thereof include first-order delay calculation. By subjecting the Mkt to the delay element processing, the response of the brake actuator BRK (state of a change of the output corresponding to a change of the input) is considered as a transfer function using the time constant, which allows the Mkf serving as a target value corresponding to the response to be calculated.

In the target acceleration calculation block DDM, a target acceleration ddMkf after the delay element processing is calculated based on the target position Mkf after the delay element processing. The ddMkf is a target value of an acceleration (angular acceleration) of the electric motor MTR. Specifically, the ddMkf is calculated through second-order differentiation of the Mkt. The ddMkf is calculated as a value having a plus sign during the acceleration of the electric motor MTR (while starting up from a stopped state), and is calculated as a value having a minus sign during the deceleration of the MTR (while shifting to the stopped state).

In the coefficient storage block KSK, a coefficient (gain) ksk for converting the target acceleration ddMkf into a target energization amount of the electric motor is stored. The coefficient ksk corresponds to a value obtained by dividing an inertia (constant) mtj of the electric motor by a torque constant tqk of the electric motor. Then, the inertia compensation control energization amounts (target values) Ijt and Ikt are calculated based on the ddMkf and the ksk. Specifically, the Ijt and the Ikt are calculated by multiplying the ddMkf by the ksk.

<Configuration of Inertia Compensation Control Block of Second Embodiment>

Figure 7:
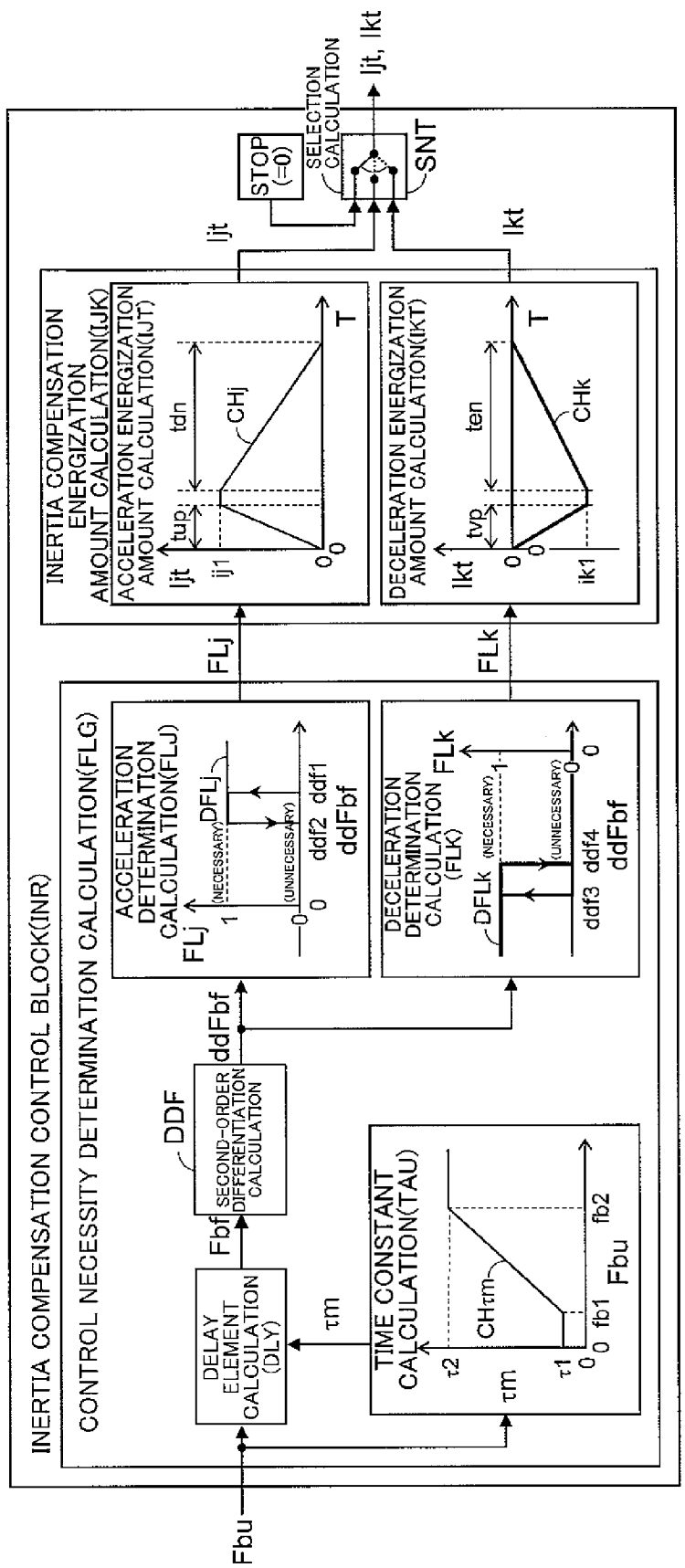
FIG. 7 is a functional block diagram illustrating an inertia compensation control block of a second embodiment illustrated in FIG. 5.

Next, with reference to FIG. 7, an inertia compensation control block INR according to a second embodiment of the present invention is described. In the inertia compensation control block INR, the inertia compensation control for improving responsiveness and convergence of the pressing force ascribable to an inertia of the MTR and the like (inertia of the entire BRK including the inertia of the MTR) is executed. The inertia compensation control block INR includes a control necessity determination calculation block FLG for determining the need of the inertia compensation control, an inertia compensation energization amount calculation block IJK for calculating the target energization amount of the inertia compensation control, and a selection calculation block SNT.

In the control necessity determination calculation block FLG, whether or not the execution of the inertia compensation control is necessary is determined. The control necessity determination calculation block FLG includes an acceleration determination calculation block FLJ for determining the need during acceleration of the electric motor (for example, when the electric motor starts up to increase the speed) and a deceleration determination calculation block FLK for determining the need during deceleration of the electric motor (for example, when the electric motor decelerates to be stopped).

As the result of determination, a necessity determination flag FLj (during acceleration) or FLk (during deceleration) is output from the control necessity determination calculation block FLG. For the necessity determination flags FLj and FLk, "0" indicates the case where the inertia compensation control is unnecessary (unnecessary state), whereas "1" indicates the case where the inertia compensation control is necessary (necessary state).

The control necessity determination calculation block FLG includes the time constant calculation block TAU, the delay element calculation block DLY, a second-order differentiation calculation block DDF, the acceleration determination calculation block FLJ, and the deceleration determination calculation block FLK.

In the same manner as in the first embodiment, in the time constant calculation block TAU, the time constant τm is calculated based on the corrected target pressing force (target value of the pressing force) Fbu and the calculation characteristic (calculation map) CHτm for the time constant. Then, in the delay element calculation block DLY, a target pressing force Fbf after the delay element calculation processing is calculated based on the target pressing force Fbu. In the delay element calculation block DLY, in the same manner as in the first embodiment, the responsiveness of the brake actuator BRK (particularly, electric motor MTR) is also considered by the transfer function (for example, first-order delay calculation). In the second-order differentiation calculation block DDF, the ddFbf is calculated through second-order differentiation of the target pressing force Fbf after the delay element processing. The ddFbf is calculated as a value having a plus sign during the acceleration of the electric motor MTR (while starting up from the stopped state), and is calculated as a value having a minus sign during the deceleration of the MTR (while shifting to the stopped state).

In the acceleration determination calculation block FLJ, it is determined, when the electric motor MTR is accelerated based on the ddFbf that has been acquired through second-order differentiation of the target pressing force Fbf after the delay element processing, whether the inertia compensation control is in the "necessary state" or in the "unnecessary state". The result of the determination is output as the necessity determination flag (control flag) FLj. In accordance with a calculation map DFLj, at a time point when the ddFbf exceeds a first predetermined acceleration (predetermined value) ddf1 (>0), the necessity determination flag FLj in the acceleration control is switched from "0 (unnecessary state)" to "1 (necessary state)" (FLj←1). Thereafter, the FLj is switched from "1" to "0" (FLj←0) at a time point when the ddFbf is less than a predetermined acceleration (predetermined value) ddf2 (<ddf1). Note that, the FLj is set to "0" as an initial value in a case where the braking operation is not performed.

In the deceleration determination calculation block FLK, it is determined, when the electric motor MTR is decelerated based on the ddFbf that has been acquired through second-order differentiation of the target pressing force Fbf after the delay element processing, whether the inertia compensation control is in the "necessary state" or in the "unnecessary state." The result of the determination is output as the necessity determination flag (control flag) FLk. In accordance with a calculation map DFLk, at a time point when the ddFbf is less than a second predetermined acceleration (predetermined value) ddf3 (<0), the necessity determination flag FLk in the deceleration control is switched from "0 (unnecessary state)" to "1 (necessary state)" (FLk←1). Thereafter, the FLk is switched from "1" to "0" (FLk←0) at a time point when the ddFbf is equal to or more than a predetermined acceleration (predetermined value) ddf4 (>ddf3, <0). Note that, the FLk is set to "0" as an initial value in a case where the braking operation is not performed.

Information on the necessity determination flags FLj and FLk for the inertia compensation control is transmitted from the control necessity determination calculation block FLG to the inertia compensation energization amount calculation block IJK.

In the inertia compensation energization amount calculation block IJK, the inertia compensation energization amount (target amount) in the case where the inertia compensation control is determined to be necessary (when FLj=1 or FLk=1) is calculated. The inertia compensation energization amount calculation block IJK includes an acceleration energization amount calculation block IJT for calculating the inertia compensation energization amount Ijt during acceleration of the electric motor (for example, when the electric motor starts up to increase the speed) and a deceleration energization amount calculation block IKT for calculating the inertia compensation energization amount Ikt during deceleration of the electric motor (for example, when the electric motor decelerates to be stopped).

In the acceleration energization amount calculation block IJT, the acceleration inertia compensation energization amount Ijt is calculated based on the necessity determination flag FLj and an acceleration calculation characteristic (calculation map) CHj. The acceleration calculation characteristic CHj is stored in advance in the ECU as the characteristic (calculation map) of the Ijt relative to an elapsed time T since the acceleration inertia compensation control is determined to be necessary. The calculation characteristic CHj is set so that the Ijt increases rapidly from "0" to a predetermined energization amount (predetermined value) ij1 along with time from the time T of "0" and thereafter decreases gently from the predetermined energization amount (predetermined value) ij1 to "0" along with time. In detail, in the CHj, a time period tup that is required for the Ijt to increase from "0" to the predetermined energization amount ij1 is set to be shorter than a time period tdn that is required for the Ijt to decrease from the predetermined energization amount ij1 to "0".

In the deceleration energization amount calculation block IKT, the deceleration inertia compensation energization amount Ikt is calculated based on the necessity determination flag FLk and a deceleration calculation characteristic (calculation map) CHk. The deceleration calculation characteristic CHk is stored in advance in the ECU as the characteristic (calculation map) of the Ikt relative to an elapsed time T since the deceleration inertia compensation control is determined to be necessary. The CHk is set so that the lid decreases rapidly from "0" to a predetermined energization amount (predetermined value) ik1 along with time from the time T of "0" and thereafter increases gently from the predetermined energization amount (predetermined value) ik1 to "0" along with time. In detail, in the CHk, a time period tvp that is required for the Ikt to decrease from "0" to the predetermined energization amount ik1 is set to be shorter than a time period ten that is required for the Ikt to increase from the predetermined energization amount ik1 to "0".

In the selection calculation block SNT, any one of the output of the inertia compensation energization amount Ijt during acceleration of the electric motor, the output of the inertia compensation energization amount Ikt during deceleration of the electric motor, and the output of control stop (output of value "0") is selected and output. In the selection calculation block SNT, in a case where the deceleration inertia compensation energization amount Ikt (<0) is output while the acceleration inertia compensation energization amount Ijt (>0) is being output, instead of the Ijt, the Ikt may be output with priority.

<Configurations of Wheel Slip State Quantity Calculation Block, Rear-Wheel Slip Suppression Control Block, and Sudden-Stop Control Block of Embodiments>

Figure 8:
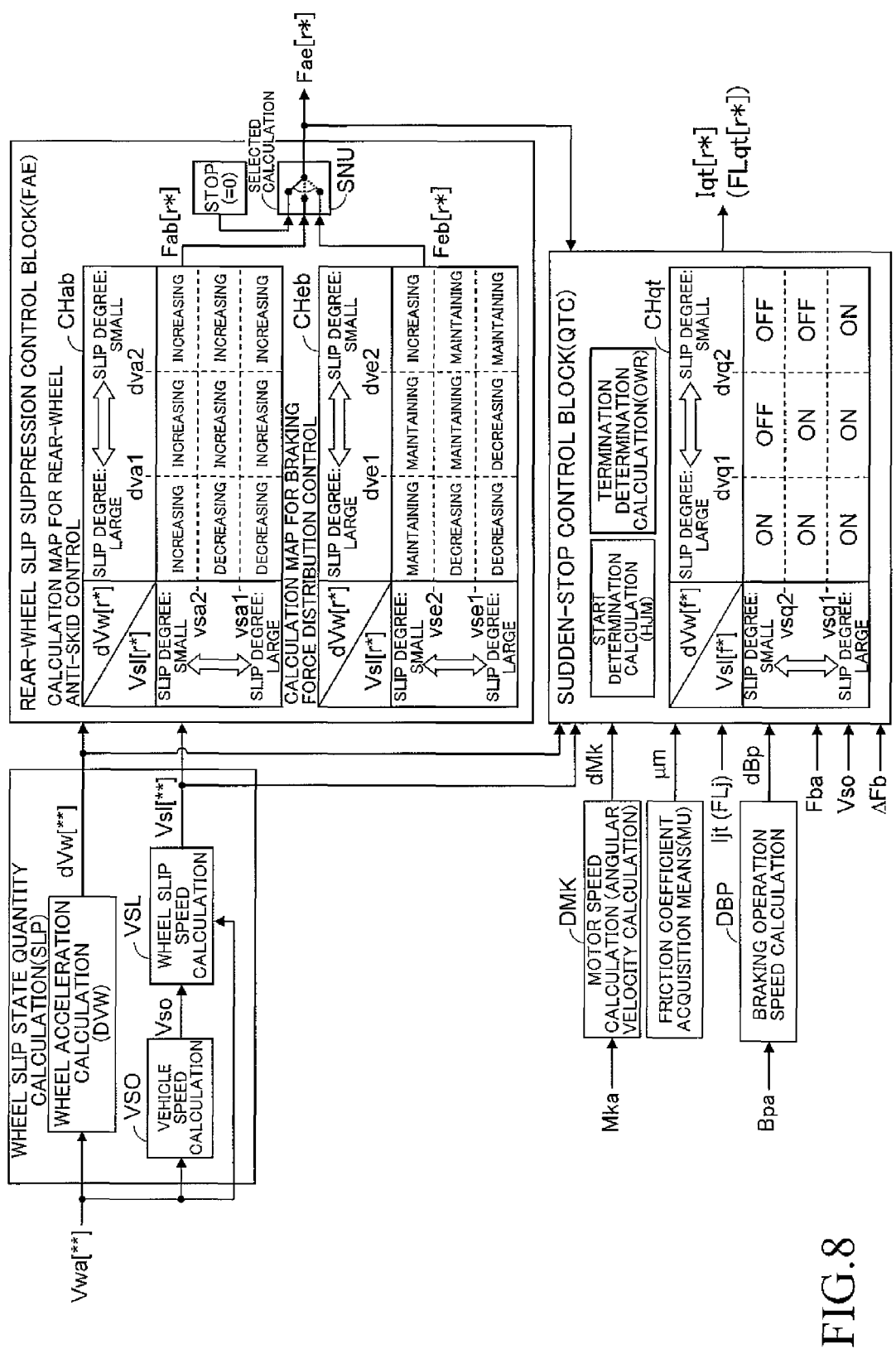
FIG. 8 is a functional block diagram illustrating a slip suppression control block (for the rear wheel) and a sudden-stop control block of the embodiments illustrated in FIG. 5.

With reference to FIG. 8, the wheel slip state quantity calculation block SLP, the rear-wheel slip suppression control block FAE, and the sudden-stop control block QTC of the embodiments are described.

<Wheel Slip State Quantity Calculation Block of Embodiments>

The wheel slip state quantity calculation block SLP includes a vehicle speed calculation block VSO, a wheel slip speed calculation block VSL, and a wheel acceleration calculation block DVW. When the braking torque is applied to the wheel, a slip (slipping between the road surface and the wheel) occurs in the wheel to generate the braking force. In the SLP, the wheel speed Vwa[] is acquired through a wheel speed sensor VWA[] or through the communication bus to calculate the wheel slip state quantity Slp[**] indicating the slip degree (how the wheel slips) in the rotational direction of each wheel.

In the vehicle speed calculation block VSO, the vehicle speed (vehicle body speed) Vso is calculated based on the wheel speed Vwa[] of each wheel and the known method. For example, the highest one of the wheel speeds Vwa[] may be selected to be calculated as the vehicle speed Vso.

In the wheel slip speed calculation block VSL, a slip speed Vsl[] of each wheel is calculated based on the vehicle speed Vso and the wheel speed Vwa. The Vsl[] is calculated as a value having a minus sign by subtracting the Vso from the Vwa[**].

In the wheel acceleration calculation block DVW, the wheel acceleration dVw[] is calculated based on the wheel speed Vwa[] of each wheel and the known method. For example, the dVw[] may be calculated through time differentiation of the Vwa[]. The wheel slip state quantity Slp[] is a value (variable) based on at least one of the state quantities, namely, the slip speed Vsl[] and the acceleration dVw[**].

<Rear Wheel Slip Suppression Control Block of Embodiments>

In the rear-wheel slip suppression control block FAE, the corrected pressing force Fae necessary for the anti-skid control (ABS control) for suppressing the slip of the rear wheel or the braking force distribution control (EBD control) is calculated. The corrected pressing force Fae is a target value for calculating the target pressing force Fbu for suppressing the wheel slip by correcting the target pressing force Fbt calculated based on the Bpa. The slip suppression control block FAE includes a calculation map CHab for the anti-skid control, a calculation map CHeb for the braking force distribution control, and a selection calculation block SNU. Note that, the braking force distribution control is the slip suppression control dedicated to the rear wheel. In the slip suppression control (anti-skid control) for suppressing the front-wheel slip, known hydraulic control is performed through intermediation of the hydraulic unit HU.

[Calculation of Corrected Value (Corrected Pressing Force) Fab of Target Pressing Force Based on Anti-Skid Control]

First, the anti-skid control (ABS control) is described. In the rear-wheel slip suppression control block FAE, the anti-skid control through intermediation of rear wheel braking means BRK[r*] is executed based on the slip state quantity Slp[r*] of the rear wheel and the calculation map CHab for the anti-skid control. The corrected pressing force Fab[r*] is determined by referring to the calculation map CHab for the ABS control indicated in the slip suppression control block FAE and selecting a control mode based on a magnitude relationship between the Vsl[r*] and the dVw[r*].

Specifically, first, the slip speed Vsl[r*] of the rear wheel is compared with predetermined values vsa1 and vsa2. The predetermined values vsa1 and vsa2 are values set in advance, and have a relationship of vsa1<vsa2<0. A wheel slip speed indicates that the slip degree becomes larger as the value thereof becomes smaller. Therefore, the value vsa1 has a larger slip degree than the value vsa2. Further, the acceleration dVw[r*] of the rear wheel is compared with predetermined values dva1 and dva2. The predetermined values dva1 and dva2 are values set in advance, and have a relationship of (dva1 (deceleration))<0<(dva2 (acceleration)). In the same manner as the wheel slip speed, the wheel acceleration indicates that the slip degree becomes larger as the value thereof becomes smaller. Therefore, the value dva1 has a larger slip degree than the value dva2.

The control mode of the ABS control is determined based on the Vsl[r*], the dVw[r*], and the CHab. The control mode of the ABS control includes a decreasing mode in which the braking torque is decreased and an increasing mode in which the braking torque is increased. In the decreasing mode, which is displayed as "decreasing" in the calculation map CHab, the pressing force is decreased. Further, in the increasing mode, which is displayed as "increasing" in the calculation map CHab, the pressing force is increased.

For example, the decreasing mode is selected when the Vsl[r*] is less than the vsa1 and the dVw[r*] is less than the dva1, and the increasing mode is selected when the Vsl[r*] is equal to or larger than the vsa1 and less than the vsa2 and the dVw[r*] is equal to or larger than the dva1 and less than the dva2.

In the decreasing mode, in order to prevent wheel locking by decreasing the wheel slip, the corrected pressing force Fab[r] based on the ABS control is calculated so as to decrease the target pressing force Fbu[r*]. In the increasing mode, in order to recover the braking force by increasing the wheel slip, the corrected pressing force (corrected value) Fab[r] is calculated so as to increase the target pressing force Fbu[r*].

[Calculation of Corrected Value (Corrected Pressing Force) Feb of Target Pressing Force Based on Braking Force Distribution Control]

Next, the braking force distribution control (EBD control) is described. In the braking force distribution control, the braking torque of the rear wheel is adjusted, to thereby adjust a ratio between the braking force generated in the front wheel and the braking force generated in the rear wheel. In the rear-wheel slip suppression control block FAE, the braking force distribution control through intermediation of electric braking means for the rear wheel BRK[r*] is executed based on the slip state quantity Slp[r*] of the rear wheel and the calculation map CHeb for the braking force distribution control. The corrected pressing force Feb[r*] is determined by referring to the calculation map CHeb for the EBD control indicated in the slip suppression control block FAE and selecting a control mode based on a magnitude relationship between the Vsl[r*] and the dVw[r*].

Specifically, first, the slip speed Vsl[r*] of the rear wheel is compared with predetermined values vse1 and vse2. The vse1 and vse2 are values set in advance, and have a relationship of vse1<vse2. The value vse1 has a larger slip degree than the value vse2. Further, the wheel acceleration dVw[r*] is compared with predetermined values dve1 and dve2. The dve1 and dve2 are values set in advance, and have a relationship of dve1<dve2. In the same manner as the slip speed, the value dve1 has a larger slip degree than the value dve2.

The control mode of the EBD control is determined based on the Vsl[r*], the dVw[r*], and the CHeb. The control mode of the EBD control includes a decreasing mode in which the braking torque is decreased, a maintaining mode in which the braking torque is maintained, and an increasing mode in which the braking torque is increased. In the decreasing mode, which is displayed as "decreasing" in the calculation map CHeb, the pressing force is decreased. In the maintaining mode, which is displayed as "maintaining" in the calculation map CHeb, the pressing force is maintained. Further, in the increasing mode, which is displayed as "increasing" in the calculation map CHeb, the pressing force is increased.

For example, the decreasing mode is selected when the Vsl[r*] is less than the vse1 and the dVw[r*] is less than the dve1, the maintaining mode is selected when the Vsl[r*] is equal to or larger than the vse1 and less than the vse2 and the dVw[r*] is equal to or larger than the dve1 and less than the dve2, and the increasing mode is selected when the Vsl[r*] is equal to or larger than the vse2 and the dVw[r*] is equal to or larger than the dve2.

In the decreasing mode, in order to secure a lateral force by decreasing the wheel slip, the corrected pressing force Feb[r*] based on the EBD control is calculated so as to decrease the target pressing force Fbu[r*]. In the maintaining mode, the corrected pressing force Feb[r*] is calculated so as to maintain the target pressing force Fbu[r*]. In the increasing mode, in order to recover the braking force by increasing the wheel slip, the corrected pressing force Feb[r*] is calculated so as to increase the target pressing force Fbu[r*].

[Prioritization Between ABS Control and EBD Control]

In the selection calculation block SNU, the Fae, which is output as the corrected value (corrected pressing force) of the final pressing force, is selected in order to prevent an interference between the ABS control and the EBD control. When neither the ABS control nor the EBD control is executed, the corrected pressing force Fae is output from the SNU as "0 (indicating that the target pressing force Fbt is not to be corrected)". When the ABS control is executed and the EBD control is not executed, the Fab is output from the SNU as the corrected pressing force Fae. In contrast, when the ABS control is not executed and the EBD control is executed, the Feb is output from the SNU as the corrected pressing force Fae. When Fab[r*] based on the ABS control and Feb[r*] based on the EBD control interfere with each other (are calculated simultaneously), the Fab[r*] is preferentially output from the selection calculation block SNU as a final corrected pressing force Fae[r*].

<Sudden-Stop Control Block QTC of Embodiments>

In the sudden-stop control block QTC, the sudden-stop control for shifting to the stopped state by rapidly decelerating the MTR[r*] is carried out based on the slip state quantity Slp[f*] of the front wheel. The sudden-stop control is control for rapidly decelerating the electric motor urgently with maximum (upper-limit) capability (performance) thereof and stopping the rotation motion. The QTC includes a calculation map CHqt, a start determination calculation block HJM, and a termination determination calculation block OWR.

[Calculation of Sudden-Stop Energization Amount Iqt]

In the calculation map CHqt for the sudden-stop control, an energization target value (sudden-stop energization amount) Iqt[r*] for the sudden-stop control is calculated based on the slip state quantity Slp[f*] of the front wheel. The calculation map CHqt is a characteristic for determining whether or not the sudden-stop control is to be executed based on the slip state quantity Slp[f*]. In this case, the slip state quantity Slp[f*] is a state quantity based on at least any one of the wheel slip speed Vsl[r] or the wheel acceleration dVw[f*].

Specifically, as shown in a calculation map (determination map) Chqt, execution of the sudden-stop control (indicated by "ON") or non-execution thereof (indicated by "OFF") is determined based on a correlation between the slip speed Vsl[f*] of the front wheel and the acceleration dVw[f*]. That is, at a time point when the condition indicated by "ON" in the figure is satisfied for the first time, the execution of the sudden-stop control is started, and the sudden-stop energization amount Iqt[r*] is instantaneously switched from "0 (non-execution of the control, indicated by "OFF" in the calculation map)" to the energization limit value (predetermined value set in advance) imm.

That is, a limit amount (predetermined value) imm that may be subjected to the energization at maximum in the rotational direction (reverse direction) of the electric motor corresponding to the direction for pulling the friction member MSB away from the rotating member KTB (direction in which the braking torque decreases) is instantaneously indicated (step-output) as the Iqt[r*]. In this case, the energization limit value imm is a value that is set in advance based on the specifications of the MTR and the DRV and that corresponds to the maximum current that may be supplied to the MTR or the DRV. For example, the energization limit value imm is a value corresponding to the maximum current of a winding (coil) of the electric motor MTR or the maximum current of a switching element (such as power transistor) that forms the driving circuit DRV of the electric motor (for example, maximum (upper-limit) current amount that may be subjected to the energization thermally).

Further, the start of the sudden-stop control may be determined based on each individual slip state quantity Slp[f*] without depending on the correlation between the Vsl[f*] and the dVw[f*]. Specifically, the Iqt is instantaneously switched from "0" to the energization limit value (limit value that is not exceeded for the energization) imm at a time point when the slip speed Vsl[f*] becomes equal to or lower than the predetermined value vsq1 and/or when the wheel acceleration dVw[f*] becomes equal to or smaller than the predetermined value dvq1.

[Start Permission Condition for Sudden-Stop Control]

In the start determination calculation block HJM, it is determined whether or not the Iqt calculated (determined) based on the calculation map CHqt may be output further from the sudden-stop control block QTC. When "control permission" is determined, in the CHqt, the Iqt determined to have the energization limit value imm is actually output. However, when "control prohibition" is determined, in the CHqt, the Iqt is not actually output (Iqt=0 is output) even in a case where Iqt=imm is calculated.

Specifically, when all the following (Condition 1) to (Condition 7) are satisfied, the "control permission" is determined. At least one condition of (Condition 1) to (Condition 7) may be omitted. When the "control permission" is not determined, the "control prohibition" is determined.

(Condition 1):

In a series of braking operations, the slip suppression control is not started before the sudden-stop control is started.

The "series of braking operations" indicates "operations carried out by the driver after the braking operation is started until the operation is terminated".

This condition may be determined based on the Bpa and the corrected pressing force Fae.

(Condition 2):

A speed dMk of the electric motor is equal to or higher than a predetermined speed (predetermined value) dmk1.

The dMk is calculated based on the position (rotation angle) Mka of the electric motor acquired by the position acquisition means (rotation angle acquisition means) MKA. Specifically, in a motor speed calculation block (angular velocity calculation block) DMK, the dMk may be calculated through time differentiation of the Mka.

(Condition 3):

The vehicle speed (vehicle body speed) Vso is equal to or higher than a predetermined speed (predetermined value) vso1.

The Vso may be calculated based on the Vwa acquired in the VWA.

(Condition 4):

In the series of braking operations, the inertia compensation control during the increase is started before the sudden-stop control is started.

This condition may be determined based on the Ijt or the FLj as illustrated in FIGS. 6 and 7.

(Condition 5):

A braking operation speed dBp is equal to or higher than the predetermined value dbp1.

The dBp may be calculated based on the Bpa acquired in the BPA. Specifically, in a braking operation speed calculation block DBP, the dBp may be calculated through time differentiation of the Bpa.

(Condition 6):

A road surface friction coefficient μm is equal to or larger than the predetermined value mu1.

The μm may be acquired based on the known method in friction coefficient acquisition means MU. Further, the μm calculated in another system may be used through the communication bus within the vehicle.

(Condition 7):

The actual pressing force Fba is equal to or larger than a predetermined pressing force (predetermined value) fba1.

The Fba may be acquired in the FBA.

The sudden-stop control has an object to decrease a rotation speed of the electric motor before the slip suppression control of the rear wheel is started, and hence (Condition 1) may be set as the permission condition. Further, the influences of the inertia of the electric motor correlate to a speed thereof, and hence (Condition 2) may be set as the permission condition. Further, when the vehicle speed is low, the slip suppression control of the rear wheel is not needed, and hence (Condition 3) may be set as the permission condition. In addition, as a typical example in which the influences of the inertia of the electric motor causes a problem in the slip suppression control of the rear wheel, there is a scene in which a sudden braking is performed by the driver on the road surface having a high road surface friction coefficient (for example, asphalt road surface that is dry), necessitating the slip suppression control of the rear wheel while the electric motor is being accelerated by the inertia compensation control during the acceleration. Therefore, (Condition 4) and (Condition 6) may be set as the permission conditions. Further, the inertia compensation control becomes necessary at the sudden braking, and hence (Condition 5) may be set as the permission condition. In addition, when the road surface friction coefficient is high, a reaction force from the road surface is secured, and hence an actual pressing force Fba exerted when the wheel slip increases is large. Therefore, (Condition 7) may be set as the permission condition.

[Termination Condition for Sudden-Stop Control]

In a termination determination calculation block OWR, it is determined whether or not the sudden-stop control is to be continued or terminated. When "control continuation" is determined, the Iqt keeps being output in actuality, but when "control termination" is determined, the Iqt is not output (Iqt=0 is output).

Specifically, when one of the following (Condition A) to (Condition D) is satisfied, the "control termination" is determined. At least one condition of (Condition A) to (Condition D) may be omitted. When the "control termination" is not determined, the "control continuation" is determined.

(Condition A):

The speed dMk of the electric motor is less than a predetermined speed (predetermined value) dmk2.

A relationship of dmk2<dmk1 is established.

(Condition B):

The vehicle speed Vso is less than a predetermined speed (predetermined value) vso2.

A relationship of vso2<vso1 is established.

(Condition C):

After the slip suppression control is started, the pressing force deviation ΔFb (=Fbu−Fba) is less than a predetermined deviation (predetermined value) hfb2.

(Condition D):

A continuation duration Tqt that has elapsed after the sudden-stop control is started exceeds a predetermined duration (predetermined value) tqt2.

The Tqc is calculated by being counted by a timer since a time point when the Iqt is switched from "0" to the value imm.

An increase in the slip due to the inertia of the electric motor occurs when the speed is high, and hence (Condition A) may be set as the termination condition. Further, the slip suppression control is terminated when the vehicle speed becomes lower, and hence (Condition B) may be set as the termination condition. Further, the sudden-stop control becomes unnecessary when the actual value Fba comes to follow the target value Fbu, and hence (Condition C) may be set as the termination condition. In addition, the sudden-stop control is urgent control of the electric motor, and hence (Condition D) may be set as the termination condition.

The calculation processing for compensating inertia influences of the MTR may require longer time, for example, when a calculation period differs among the respective state quantities, when the detected value for calculating each state quantity has a low resolution, or when values of a plurality of calculation periods are compared with each other in order to prevent an error from occurring in the detected value or the calculated value. For example, in the inertia compensation control during the deceleration, a temporal delay may occur during the rapid deceleration of the MTR when (absolute value of) the inertia compensation energization amount Ikt is gradually increased after calculation processing that requires longer time than the calculation processing for the wheel slip state quantity (processing in which one calculation period is long or processing that requires a plurality of periods for calculation) is carried out. In contrast, in the sudden-stop control, the energization amount of a physically maximum extent is indicated stepwise to the MTR, and hence the MTR may be immediately decelerated rapidly without causing a temporal delay. Accordingly, the wheel slip may be suppressed efficiently and reliably.

In addition, on the assumption that the "value obtained by dividing the braking force generated in a given wheel by the vertical load (normal force) acting on the given wheel" is referred to as "braking load", in a general vehicle, front-and-rear braking forces are distributed so that the braking load on the front wheel is larger than the braking load on the rear wheel. In other words, compared to so-called "ideal braking force distribution" (front-and-rear braking force distribution in which wheel locking occurs in the front and rear wheels simultaneously during the braking), the ratio of the braking forces between the front and rear wheels is determined so that the ratio of the braking force to the vertical load on the front wheel becomes larger than the ratio of the braking force to the vertical load on the rear wheel. The braking force of the wheel is generated by the slip (slipping between the road surface and the wheel) that occurs as a result of the braking torque applied to the wheel. Accordingly, at the same deceleration, the slip degree of the front wheel is larger than the slip degree of the rear wheel. In other words, a slip state of the rear wheel expected to increase thereafter may be predicted by a front-wheel slip state quantity Slp[f*]. Further, in order to maintain vehicle stability, it is necessary to suppress the increase in the slip of the rear wheel and secure a sufficient lateral force of the rear wheel. From the above-mentioned knowledge, in this embodiment, it may be determined based on the slip state quantity Slp[f*] of the front wheel whether or not the sudden-stop control needs to be executed for the rear wheel. Therefore, the sudden-stop control of the rear wheel may be started at an earlier stage, and the increase in the slip of the rear wheel may be suppressed more reliably than in a mode in which it is determined based on the slip state quantity Slp[r*] of the rear wheel whether or not the sudden-stop control needs to be executed for the rear wheel.

The sudden-stop control may be started based on the value of the state quantity having the smaller value selected between the slip state quantities Slp[f*] of the right and left front wheels. That is, an execution start of the sudden-stop control of the rear wheel is determined based on the slip state quantity of the wheel exhibiting the largest extent of the slip between the front wheels. Further, when the start of the sudden-stop control is determined for one of the right and left rear wheels, the sudden-stop control may be started even in a case where the start of the sudden-stop control is not determined for the other rear wheel. The sudden-stop control may be terminated separately for the right and left rear wheels. The execution of the sudden-stop control of the rear wheel is determined based on the slip state quantity of the wheel having the largest slip degree, and hence the sudden-stop control may be started at an earlier stage, and the increase in the slip of the rear wheel may be suppressed more reliably. Further, the termination of the sudden-stop control is determined independently for each wheel, and hence the transition may be reliably made to the slip suppression control (anti-skid control or the like).

<Anti-Skid Control Through Intermediation of Hydraulic Braking Means for Front Wheel>

Figure 9:
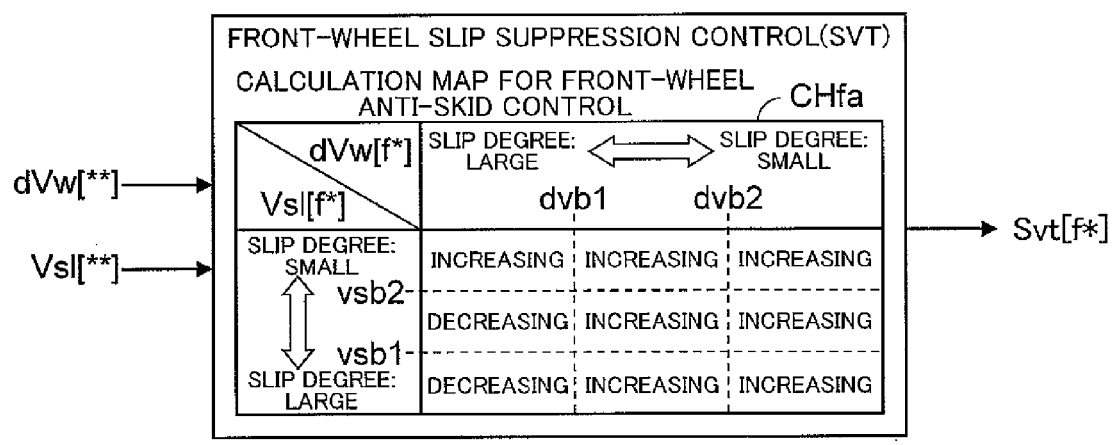
FIG. 9 is a functional block diagram illustrating a slip suppression control block for a front wheel of the embodiments.

Next, with reference to FIG. 9, the slip suppression control of the front wheel of the embodiments is described. Note that, the braking force distribution control (EBD control) is control limited to the rear wheel, and hence the slip suppression control of the front wheel is the anti-skid control for preventing the locking tendency of the wheel. In a front-wheel slip suppression control block SVT, the anti-skid control of the front wheel through intermediation of the hydraulic braking means for the front wheel BRH (hydraulic unit HU) is carried out based on the wheel acceleration dVw[] and the wheel slip speed Vsl[] calculated in the wheel slip state quantity calculation block SLP. In the SVT, the instruction signals Svt[f*] for driving the solenoid valve and the hydraulic pump/the electric motor that form the hydraulic unit HU are calculated.

The anti-skid control of the front wheel through intermediation of the front wheel braking means BRH is executed based on the slip state quantity Slp[f*] (Vsl[f*], dVw[r]) of the front wheel and a calculation map CHfa for the anti-skid control. Specifically, first, the slip speed Vsl[f*] of the front wheel is compared with predetermined values vsb1 and vsb2. The predetermined values vsb1 and vsb2 are values set in advance, and have a relationship of vsb1<vsb2<0. The slip degree becomes larger as the value of the wheel slip speed becomes smaller. The value vsb1 has a larger slip degree than the value vsb2. Further, the acceleration dVw[r] of the front wheel is compared with predetermined values dvb1 and dvb2. The predetermined values dvb1 and dvb2 are values set in advance, and have a relationship of (dvb1 (deceleration))<0<(dvb2 (acceleration)). In the same manner as the wheel slip speed, the slip degree becomes larger as the value of the wheel acceleration becomes smaller. The value dvb1 has a larger slip degree than the value dvb2.

Then, the control mode of the ABS control is determined based on the Vsl[f*], the dVw[f*], and the CHfa. The control mode of the ABS control includes the decreasing mode in which the braking torque is decreased and the increasing mode in which the braking torque is increased. In the decreasing mode, which is displayed as "decreasing" in the calculation map CHfa, the braking hydraulic pressure is decreased. Further, in the increasing mode, which is displayed as "increasing" in the calculation map CHfa, the braking hydraulic pressure is increased. For example, the decreasing mode is selected when the Vsl[f*] is less than the vsb1 and when the dVw[t*] is less than the dvb1, while the increasing mode is selected when the Vsl[f*] is equal to or larger than the vsb1 and less than the vsb2 and when the dVw[f*] is equal to or larger than the dvb1 and less than the dvb2.

In the decreasing mode, in order to prevent the wheel locking by decreasing the wheel slip, the instruction signal Svt for the electric motor for driving the hydraulic pump and the solenoid valve within the HU is calculated so as to decrease the braking hydraulic pressure. In the increasing mode, in order to recover the braking force by increasing the wheel slip, the instruction signal Svt is calculated so as to increase the braking hydraulic pressure.

The anti-skid control of the front wheel and the sudden-stop control of the rear wheel are both carried out based on the front-wheel slip state quantity Slp[f*]. In the relationship between both, the sudden-stop control may be started at an earlier stage than the front-wheel anti-skid control. Specifically, a start threshold value vsq1 of a slip speed of the sudden-stop control is set to a value larger than a start threshold value vsb1 of the slip speed of the front-wheel anti-skid control (0>vsq1>vsb1). The slip degree becomes larger as the value of the wheel slip speed becomes smaller, while the slip degree becomes smaller as the value becomes larger, and hence the sudden-stop control is started with "the slip degree of the front wheel" smaller than that in the front-wheel anti-skid control. In the same manner, a start threshold value dvq1 of the wheel acceleration for the sudden-stop control is set to a value larger than a start threshold value dvb1 of the wheel acceleration for the front-wheel anti-skid control (dvq1>dvb1). The slip degree becomes larger as the value of the wheel acceleration becomes smaller, while the slip degree becomes smaller as the value becomes larger, and hence the sudden-stop control may be started with "the slip degree of the front wheel" smaller than that in the front-wheel anti-skid control. Therefore, the sudden-stop energization amount Iqt is calculated and output before the braking hydraulic pressure of the front wheel is decreased. As a result, the sudden stop of the MTR is started by a slight increase in the slip, and hence the increase in the slip of the rear wheel may be suppressed more reliably.

<Functions and Effects>

Figure 10:
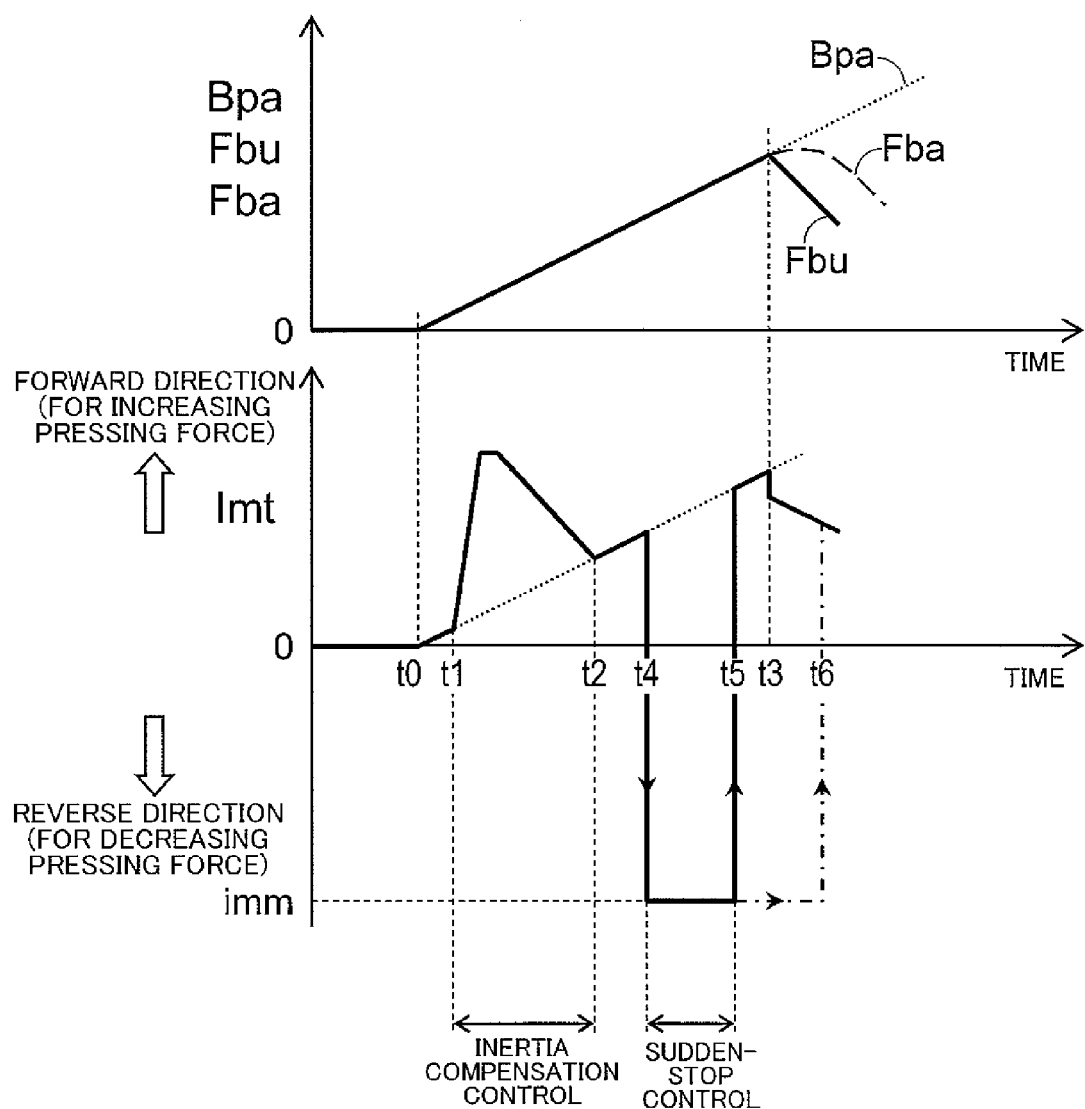
FIG. 10 is a first time chart illustrating functions and effects of sudden-stop control.
Figure 11:
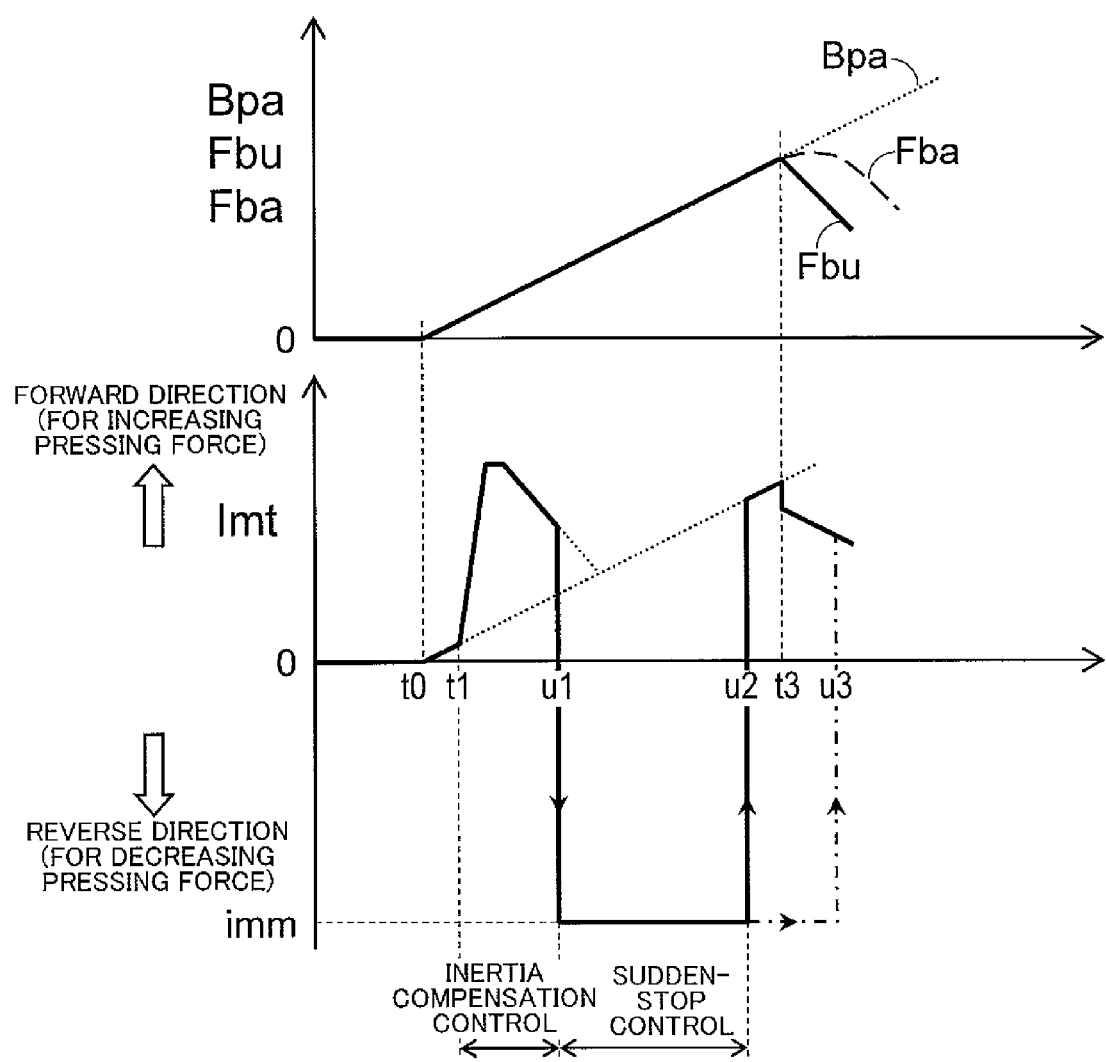
FIG. 11 is a second time chart illustrating functions and effects of sudden-stop control.
Figure 12:
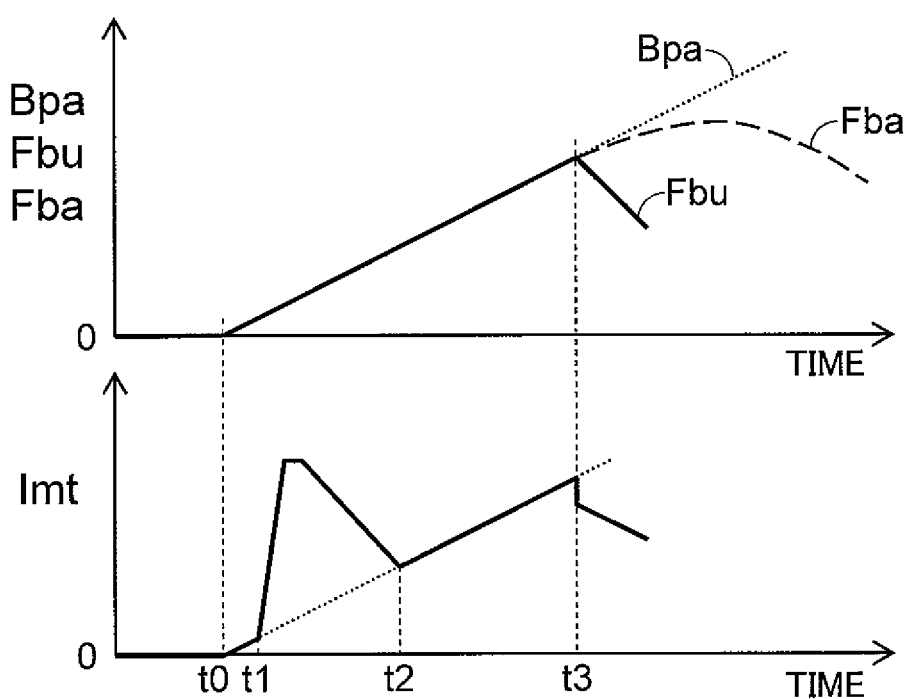
FIG. 12 is a time chart illustrating a problem of a related-art brake control device.

Next, with reference to FIG. 10 and FIG. 11, functions and effects of the present invention are described. FIG. 10 shows an example of a time-series waveform obtained in a "case where the sudden-stop control is executed after the inertia compensation control during the acceleration is carried out", and FIG. 11 shows an example of a time-series waveform obtained in a "case where the sudden-stop control is executed during the execution of the inertia compensation control".

Note that, the suffix [] appended to the end of each kind of symbol or the like indicates which of the four wheels each kind of symbol or the like relates to. In a case where the suffix is [] (including a case where there is no suffix due to omission of [**]), each kind of symbol relating to the four wheels generically indicates the four wheels. In a case where the suffix is [f*] (including a case where there is no suffix due to omission of [f*]), each kind of symbol relating to the front wheel generically indicates the front wheels. Further, in a case where the suffix is [r*] (including a case where there is no suffix due to omission of [r*]), each kind of symbol relating to the rear wheel generically indicates the rear wheels. For example, Vwa[**] and Vwa generically indicate the wheel speed for the four wheels, Svt[f*] and Svt generically indicate a control instruction signal for the front wheel, and Imt[r] and Imt generically indicate the target energization amount for the rear wheel.

As shown in FIG. 10, in this example, at the time point t0, the braking operation is started by the driver, and the braking operation amount Bpa starts to increase. In accordance with the increase in the Bpa, the target pressing force (target value) Fbu[r*] increases. At the time point t1, the inertia compensation control during the acceleration is started, and the increasing target energization amount Imt[r] of the electric motor is increased by the inertia compensation control energization amount (target value) Ijt[r*] from the value based on the Fbu in the forward direction of the electric motor (direction for increasing the pressing force). The inertia compensation control also increases the actual value Fba of the pressing force. Then, at the time point t4 at which the front-wheel slip state quantity Slp[f*] falls below the predetermined value (for example, vsa1, dva1) (when the slip degree of the front wheel becomes larger than a predetermined state), the sudden-stop control is switched from a non-execution state to an execution state. At this time point t4, the sudden-stop control is started, and the target energization amount Imt[r*] is decreased stepwise down to the energization limit value imm by the sudden-stop energization amount Iqt[r*] in the reverse direction of the electric motor (direction for decreasing the pressing force). In this case, the energization limit value imm is a value set in advance based on the maximum value of the current that may be supplied to at least one of the electric motor MTR (for example, motor winding) and the driving circuit DRV (for example, element) of the electric motor. According to the sudden-stop control, the electric motor is decelerated to a maximum extent in terms of performance, and an overshoot of the actual pressing force Fba is suppressed.

The sudden-stop control is continued until the above-mentioned termination condition is satisfied. For example, when the termination condition is satisfied before the slip suppression control of the rear wheel is started, at that time point (t5), the sudden-stop control is terminated, and the Imt is returned to the value based on the Fbu. When the termination condition is not satisfied even after the slip suppression control of the rear wheel is started, the sudden-stop control is continued. For example, in the example indicated by the alternate long and short dash line of FIG. 10, the start of the slip suppression control is determined at the time point t3. However, the execution of the sudden-stop control is maintained, and hence the target energization amount Imt is still maintained at the energization limit value imm. Then, at the time point t6 at which the termination condition for the sudden-stop control is satisfied, and the Imt is returned to the value based on the Fbu.

As shown in FIG. 11, when the inertia compensation control and the sudden-stop control are executed simultaneously, the execution of the sudden-stop control is prioritized. For example, in a case where the Imt is calculated in the inertia compensation control by being increased by the Ijt from the value based on the Fbu, when the sudden-stop control is started (time point u1), the inertia compensation control is switched to the non-execution state, and the Imt is decreased stepwise down to the energization limit value imm. In this sudden-stop control, the energization amount (limit value imm) is indicated to the MTR to a maximum extent in terms of the performance of the electric motor MTR. As a result, the increase in the wheel slip ascribable to the inertia of the electric motor may be suppressed efficiently and reliably, and stability of the vehicle may be ensured.

The target pressing force Fbt[r*] takes fluctuations of the vertical load during the braking of the vehicle into consideration, and based on the Bpa, the braking load on the front wheel (value indicating a load state of the wheel, which is obtained by dividing the braking force by the vertical load) is determined so as to become larger than the braking load on the rear wheel. Specifically, the target pressing force Fbt[r*] is calculated by using a characteristic CHfb illustrated in FIG. 5 in which the front-wheel braking load becomes larger than the rear-wheel braking load. The wheel having a heavy braking load (ratio between the normal force and the braking force) tends to have a larger slip degree than the wheel having a light braking load. The sudden-stop control of the rear wheel is executed based on the slip state quantity of the front wheel having a heavy braking load. Accordingly, the sudden-stop control may be started at an earlier stage, and the slip of the rear wheel may be suppressed more reliably.

Other Embodiments

[Sudden-Stop Control (Dynamic Brake) of Another Embodiment]

Now with reference to FIGS. 3 to 5 and FIG. 8, the sudden-stop control block QTC of a second embodiment of the present invention is described.

In the QTC of the first embodiment, as the sudden-stop control, the target energization amount Imt[r*] of the electric motor is switched stepwise to the energization limit value imm by the sudden-stop energization amount Iqt[r*] as illustrated in FIG. 5 and FIG. 8. In the second embodiment, in place thereof, when the execution of the sudden-stop control is started, the Imt is set to "0", and a short circuit is established between the terminals of the electric motor through intermediation of an electric resistance (for example, resistor). The electric motor MTR is rapidly decelerated by a so-called dynamic brake (hereinafter also referred to as "rheostatic brake"), which brings the motion thereof to a stop. In this case, the electric resistance exists in a short-circuit, and hence the resistor is not always necessary. The second embodiment is the same as the first embodiment described with reference to FIG. 5 and FIG. 8 except that a control flag FLqt[r*] to be described later is output from the QTC, the Imt is set to "0", and a short circuit is established between the terminals of the electric motor, and hence descriptions thereof are omitted.

As a result of comparing the front-wheel slip state quantity Slp[f*] (state quantity based on at least any one of the front-wheel slip speed Vsl[f*] and the front-wheel acceleration dVw[f*]) with the predetermined value (vsa1 or the like), the execution start of the sudden-stop control is determined at a time point when the condition indicated by "ON" in the calculation characteristic CHqt illustrated in FIG. 8 is satisfied. At this time, "1 (execution of the control)" is output from the QTC as the control flag FLqt. Note that, when the Slp[f*] is in a state indicated by "OFF" in the CHqt (when the sudden-stop control is determined to be non-execution), "0 (non-execution of the control)" is transmitted as the control flag FLqt (FLqt=0). Then, in the switching control block SWT, an execution flag FLqt of the sudden-stop control is received as "1", the switching element is driven so that a short circuit is established between the terminals of the electric motor through intermediation of the electric resistance, and the target energization amount Imt is decreased to "0".

In the configuration of the driving means DRV (driving circuit for the brush motor) illustrated in FIG. 3, the execution start of the sudden-stop control is determined, while at a time point when the control flag FLqt is switched from "0 (non-execution state)" to "1 (execution state)", the switching elements S1 and S2 are set in the energized state, the switching elements S3 and S4 are set in the nonenergized state, and a short circuit state is established between terminals Is and Tb of the electric motor. Alternatively, the switching elements S3 and S4 may be set in the energized state, the switching elements S1 and S2 may be set in the nonenergized state, and a short circuit state may be established between the terminals (between Ts-Tb) of the electric motor MTR. In this case, at the same time when a short circuit is established between the terminals of the electric motor through intermediation of the electric resistance, the target energization amount Imt of the MTR is decreased down to "0 (nonenergized state)".

In the configuration of the driving means DRV (driving circuit for the brushless motor) illustrated in FIG. 4, at a time point when the execution of the sudden-stop control is determined (FLqt←1), two or more elements of the switching elements Z1 to Z3 are set in the energized state, all the elements of the switching elements Z4 to Z6 are set in the nonenergized state, and a short circuit state is established between at least one pair of terminals Tu, Tv, and Tw of the electric motor. Further, two or more elements of the switching elements Z4 to Z6 may be set in the energized state, all the elements of the switching elements Z1 to Z3 may be set in the nonenergized state, and a short circuit state may be established between at least one pair of the three terminals. In the same manner as in the case of the DRV illustrated in FIG. 3, at the same time when a short circuit is established between the terminals of the electric motor through intermediation of the electric resistance, the target energization amount Imt is set to "0".

Further, an individual switching circuit (for example, relay circuit) may be provided between the terminals of the electric motor. In this case, a short circuit may be established between the terminals of the electric motor through intermediation of the electric resistance (resistor) without use of the above-mentioned switching element (S1 or the like). In the same manner as described above, the switching circuit is driven by a signal from the switching control block SWT based on the control flag FLqt indicating the execution/non-execution of the sudden-stop control. That is, based on the signal, the relay between the terminals of the electric motor may be switched between an energized (ON) state or non-energized (OFF) state.

By the dynamic brake for establishing a short circuit between the terminals of the electronic motor through intermediation of the electric resistance (for example, resistor), the electric power generated by using the electric motor as a generator is consumed by the electric resistance. As a result, the braking torque is applied to the electric motor MTR, which leads to deceleration thereof. That is, regenerative electric power generated by kinetic energy (rotational energy) of the MTR is thermally consumed by the electric resistance within the electric motor including the driving circuit DRV, which may bring the MTR to an end quickly. Note that, the electric resistance may exist in the circuit formed by establishing a short circuit between the terminals of the electric motor, and hence the individual resistor may not be provided.

[Inertia Compensation Control of Another Embodiment]

In the inertia compensation control block INR of the first embodiment as illustrated in FIG. 6, the Mkt is calculated based on the Fbu, and the Ijt and the Ikt are determined finally. For the same reason as the description of the "pressing force corresponding value Fbs" described above, a correlation exists between the state quantity relating to the "force" of the movable member located in the power transmission path from the output from the MTR to the pressing force of the MSB and the state quantity relating to the "position" thereof. For example, the Fbu and the Mkt may be calculated based on the CHmk in consideration of the correlation. Therefore, in place of the Mkt, a value Fsf obtained by subjecting the target value (target pressing force corresponding value) Fst of the Fbs to delay processing may be second-order differentiated, and the Ijt and the Ikt may be calculated based on a second-order differential value ddFsf.

In the same manner, in the INR of the second embodiment illustrated in FIG. 7, the FLj and the FLk are calculated based on a second-order differential value ddFbf of the Fbu, but the FLj and the FLk may be calculated based on the ddFsf (second-order differential value of the target pressing force corresponding value subjected to the delay processing in the DLY).

The invention claimed is:
1. A vehicle brake control device, comprising:
   electric braking means for generating a braking torque of a rear wheel of a vehicle through intermediation of an electric motor, which is mechanically connected to a friction member to thereby mechanically actuate said friction member, by pressing the friction member against a rotating member rotating together with said rear wheel;
   wheel speed acquisition means for acquiring speeds of four wheels of the vehicle;
   slip state quantity calculation means for calculating, based on the speeds of the four wheels, a slip state quantity indicating slip degrees of the four wheels of the vehicle; and control means for calculating, based on a slip state quantity of the rear wheel, a target energization amount of the electric motor in order to execute slip suppression control of the rear wheel for suppressing a slip of the rear wheel, and controlling the electric motor for the rear wheel based on the target energization amount, wherein the control means is configured to make the electric motor rotate in a forward direction to increase the braking torque, to adjust, based on a slip state quantity of a front wheel, the target energization amount so that the electric motor is rotated in a reverse direction to decrease the braking torque in order to execute sudden-stop control for rapidly stopping the forward direction motion of the electric motor, and to control the electric motor for the rear wheel based on the adjusted target energization amount.

2. The vehicle brake control device according to claim 1, wherein the control means is configured to start the sudden-stop control on condition that the slip suppression control of the rear wheel is not being executed.

3. The vehicle brake control device according to claim 1, further comprising hydraulic braking means for generating a braking torque of the front wheel by way of a braking hydraulic pressure, wherein the control means is configured to:
reduce, based on the slip state quantity of the front wheel, the braking hydraulic pressure of the front wheel in order to execute the slip suppression control of the front wheel for suppressing a slip of the front wheel;
start the sudden-stop control when the slip degree of the front wheel indicated by the slip state quantity of the front wheel exceeds a first degree; and
start the slip suppression control of the front wheel when the slip degree of the front wheel indicated by the slip state quantity of the front wheel exceeds a second degree that is larger than the first degree.

4. The vehicle brake control device according to claim 1, wherein the control means is configured to change, as the sudden-stop control, the target energization amount of the electric motor stepwise to an energization limit value set in advance corresponding to a deceleration direction of the electric motor when the starting of the sudden-stop control is determined.

5. The vehicle brake control device according to claim 4, wherein the energization limit value is determined based on a maximum value of a current to be supplied to at least one of the electric motor or a driving circuit of the electric motor.

6. The vehicle brake control device according to claim 1, wherein the control means is configured to set, as the sudden-stop control, the target energization amount of zero when the starting of the sudden-stop control is determined, and establish a short circuit between terminals of the electric motor.

7. The vehicle brake control device according to claim 1, further comprising motor speed acquisition means for acquiring a speed of the electric motor,
wherein the control means is configured to start the sudden-stop control on condition that the speed of the electric motor is equal to or higher than a first predetermined speed.

8. The vehicle brake control device according to claim 7, wherein the control means is configured to terminate the sudden-stop control when the speed of the electric motor becomes lower than a second predetermined speed that is lower than the first predetermined speed.

9. The vehicle brake control device according to claim 1, wherein the control means is configured to adjust, during braking of the vehicle, the braking torque applied to the rear wheel so that a ratio of a braking force generated in the front wheel to a vertical load acting on the front wheel becomes larger than a ratio of a braking force generated in the rear wheel to a vertical load acting on the rear wheel.

\* \* \* \* \*